(12) United States Patent
Mueller et al.

(10) Patent No.: US 7,947,244 B2
(45) Date of Patent: May 24, 2011

(54) SILICATE PRODUCING METHOD

(75) Inventors: Ulrich Mueller, Neustadt (DE); Roger Ruetz, Mannheim (DE); Hermann Gies, Sprockhoevel (DE)

(73) Assignees: BASF SE, Ludwigshafen (DE); rubitec GmbH, Bochum (DE)

( * ) Notice: Subject to any disclaimer, the term of this patent is extended or adjusted under 35 U.S.C. 154(b) by 0 days.

(21) Appl. No.: 12/090,027

(22) PCT Filed: Oct. 11, 2006

(86) PCT No.: PCT/EP2006/067269
§ 371 (c)(1),
(2), (4) Date: Apr. 11, 2008

(87) PCT Pub. No.: WO2007/042531
PCT Pub. Date: Apr. 19, 2007

(65) Prior Publication Data
US 2008/0253953 A1   Oct. 16, 2008

(30) Foreign Application Priority Data

Oct. 12, 2005 (DE) .......................... 10 2005 049 362

(51) Int. Cl.
C01B 33/00 (2006.01)
C01B 33/20 (2006.01)
C01B 33/26 (2006.01)

(52) U.S. Cl. ...... 423/325; 423/324; 423/326; 423/327.1

(58) Field of Classification Search .................. 423/324, 423/325, 326, 327.1
See application file for complete search history.

(56) References Cited

U.S. PATENT DOCUMENTS

| 5,296,211 | A | * | 3/1994 | Baldus et al. | 423/302 |
| 5,885,546 | A | * | 3/1999 | Kumar et al. | 423/703 |
| 6,329,062 | B1 | * | 12/2001 | Gaynor | 428/447 |
| 6,380,119 | B1 | | 4/2002 | Grosch et al. | |
| 6,710,002 | B2 | | 3/2004 | Grosch et al. | |
| 7,314,605 | B2 | * | 1/2008 | Wang et al. | 423/326 |

FOREIGN PATENT DOCUMENTS

DE   197 23 949   12/1998
WO   98/55228   12/1998

OTHER PUBLICATIONS

R.A. Young (editor), "The Rietveld Method", Oxford University Press, 1995, Oxford, Chapter 7: Analytical Profile fitting of X-ray Powder diffraction profiles in Rietveld analysis, pp. 111-131.
Ch. Baerlocher, W.M. Meier, D.H. Olson, "Atlas of Zeolite Framework Types Fifth, Edition", 2001 Elsevier, pp. 10-15.
Ullmanns Encyclopedia of Technical Chemistry, 4$^{th}$ Edition, vol. 2, pp. 295 et seq., 1972.
Donald W. Breck, "Zeolite Molecular Sieves" 1974, J. Wiley, pp. 634-641.
Y. X. Wang, et al., "Synthesis and Crystal Structure of Zeolite Rub-41 Obtained As Calcination Product of a Layered Precursor: a Systematic Approach to a New Synthesis Route", Chem. Mater, vol. 17, Dec. 15, 2004, pp. 43-49.
U.S. Appl. No. 12/594,727, filed Oct. 5, 2009, Mueller, et al.

* cited by examiner

Primary Examiner — Jerry Lorengo
Assistant Examiner — Jared Wood
(74) Attorney, Agent, or Firm — Oblon, Spivak, McClelland, Maier & Neustadt, L.L.P.

(57) ABSTRACT

The present invention relates to a process for the preparation of a silicate comprising at least silicon and oxygen, comprising
(1) mixing of silicon dioxide and/or of a silicon dioxide precursor with an aqueous solution comprising at least one tetraalkylammonium compound comprising $R_1R_2R_3R_4N^+$ and at least one base, wherein $R_1$ and $R_2$ are methyl and both $R_3$ and $R_4$ are n-propyl;
(2) heating of the colloidal solution obtained according to (1) to a temperature in the range of from greater than the boiling point of the colloidal solution under the chosen pressure to 180° C. at atmospheric pressure to give a suspension comprising at least one silicate,
wherein the silicate comprising at least silicon and oxygen is added as a crystallization auxiliary in (1).

18 Claims, 8 Drawing Sheets

SILICATE PRODUCING METHOD

The present invention relates to a process for the preparation of silicates, in particular for the preparation of framework silicates having a zeolite structure. The present invention also relates to the silicates obtainable by this process, in particular, sheet silicates and framework silicates. The present invention furthermore relates to these silicates per se and to the use thereof, in particular the use thereof as molecular sieves for separating and/or separating off mixtures of substances, in particular separating alkane and/or alkene gas mixtures.

In chemical production or purification processes, it is frequently the object to separate off at least one substance from a mixture of substances or very generally to separate mixtures of substances. In principle, this separation can be achieved by distillative processes. However—particularly in the case of mixtures boiling within a very narrow range—these distillative processes can be carried out in an economically expedient manner only with the use of auxiliary agents, if at all. An example of the separation of mixtures boiling within a narrow range is the separation of alkanes or alkenes, such as, for example, the separation of isomeric alkanes or alkenes.

One of the objects of the present invention was therefore to provide novel compounds which can be employed as molecular sieves and/or adsorbents for separating off and/or separation of this type.

A further object of the present invention was to provide a process for the preparation of these compounds.

A further object of the present invention was to provide novel silicates, in particular zeolites, which firstly can be advantageously employed for the intended uses described above but also for any further conceivable purpose, such as, for example, as catalysts or in other technical areas.

The present invention accordingly relates to a process for the preparation of a silicate comprising at least silicon and oxygen, comprising (1) mixing of silicon dioxide and/or of a silicon dioxide precursor with an aqueous solution comprising at least one tetraalkylammonium compound comprising $R_1R_2R_3R_4N^+$ and at least one base, wherein $R_1$ and $R_2$ are methyl and both $R_3$ and $R_4$ are n-propyl;

(2) heating of the colloidal solution obtained under (1) to a temperature in the range of from greater than the boiling point of the colloidal solution under the chosen pressure to 180° C. at atmospheric pressure to give a suspension comprising at least one silicate, wherein the silicate comprising at least silicon and oxygen is added as a crystallization auxiliary in (1).

In addition to the at least one tetraalkylammonium compound comprising $R_1R_2R_3R_4N^+$, it is possible, according to the invention, to use a base differing from this compound. For example, ammonium hydroxide $NH_4OH$, alkali metal hydroxides or alkaline earth metal hydroxides, such as, for example, sodium hydroxide or potassium hydroxide or mixtures of two or more of these compounds, may be mentioned here. In this case, the at least one tetraalkylammonium compound comprising $R_1R_2R_3R_4N^+$ comprises one or more suitable anions, such as, for example, halogen anions, such as, for example, fluoride or chloride or bromide or iodide.

According to a preferred embodiment, the at least one tetraalkylammonium compound comprising $R_1R_2R_3R_4N^+$ also comprises the base used according to (1) as an anion. Inter alia, the hydroxide ion or aluminates may be mentioned as basic anions in this context. A particularly preferred basic anion is the hydroxide ion.

Accordingly, the present invention also relates to a process as described above, wherein the at least one tetraalkylammonium compound comprising $R_1R_2R_3R_4N^+$ comprises a basic anion, preferably a hydroxide ion.

The present invention therefore also relates to a process as described above, wherein the aqueous solution used according to (1) comprises dimethyldipropylammonium hydroxide (DMDPAH).

The molar ratios of silicon dioxide and/or silicon dioxide resulting from the precursor compound, tetraalkylammonium compound, in particular tetraalkylammonium hydroxide compound, and water can be adjusted substantially arbitrarily, provided it is ensured that, according to (2), at least one silicate is obtained by crystallization.

According to a preferred embodiment the amounts of silicon dioxide and/or silicon dioxide resulting from a precursor tetraalkylammonium hydroxide compound and water, which are employed, are chosen so that the colloidal solution obtained according to (1) comprises silicon dioxide, tetraalkylammonium hydroxide compound and water in weight ratios in the range of 1:(0.4-10):(4-12). Furthermore, with regard to the above-mentioned ranges water contents up to 15 are possible, where, for example, 3 may be mentioned as the lower limit. Accordingly, the colloidal solution obtained according to (1) may comprise silicon dioxide, tetraalkylammonium hydroxide compound and water in weight ratios in the range of from 1:(0.4-10):(3-15). According to the invention, the water content may furthermore be in the range of from 4 to 15 or from 5 to 15 or from 6 to 15 or from 7 to 15 or from 8 to 15 or from 9 to 15 or from 10 to 15 or from 11 to 15 or from 12 to 15 or from 13 to 15 or from 14 to 15 or from 3 to 14 or from 3 to 13 or from 3 to 12 or from 3 to 11 or from 3 to 10 or from 3 to 9 or from 3 to 8 or from 3 to 7 or from 3 to 6 or from 3 to 5 or from 3 to 4. Further preferred ranges are, for example, of from 4 to 14.5 or from 5 to 14 or from 6 to 13.5 or from 7 to 13 or from 7.5 to 12.5. According to the invention, the content of tetraalkylammonium hydroxide compound may be, for example, in the range of from 0.5 to 9 or from 0.6 to 8 or from 0.7 to 7 or from 0.8 to 6 or from 0.9 to 5 or from 1.0 to 4 or from 1.1 to 3 or from 1.2 to 2.

According to a particularly preferred embodiment of the present invention, the colloidal solution obtained according to (1) comprises $SiO_2$, DMDPAH and water in the weight ratios $SiO_2$:DMDPAH:water of 1:(0.4-2):(4-8), more preferably of 1:(0.5-1.9):(4-8), more preferably of 1:(0.6-1.8):(4-8), more preferably of 1:(0.7-1.7):(4-8), more preferably of 1:(0.8-1.6):(4-8), more preferably of 1:(0.9-1.5):(4-8), more preferably of 1:(1.0-1.4):(4-8), more preferably of 1:(1.1-1.3):(4-8), wherein the proportion of water is in each case more preferably in the range of from 5 to 7.

According to a further embodiment of the present invention, the colloidal solution obtained according to (1) comprises $SiO_2$, DMDPAH and water in the weight ratios $SiO_2$:DMDPAH:water of 1:(0.45-0.55):(8-12), more preferably of 1:(0.46-0.54):(8-12), more preferably of 1:(0.47-0.53):(8-12), more preferably of 1:(0.48-0.52):(8-12) and particularly preferably of 1:(0.49-0.51):(8-12). The water content in each case is more preferably in the range of from 8 to 11 or from 8 to 10 or from 8 to 9 or from 9 to 12 or from 9 to 11 or from 9 to 10 or from 10 to 12 or from 10 to 11 or from 11 to 12.

The present invention therefore also relates to the use of dimethyldipropylammonium hydroxide, preferably as a structure-forming agent, in the synthesis of a silicate, preferably in the hydrothermal synthesis of a silicate, wherein the silicate preferably is a sheet silicate or framework silicate, and the framework silicate more preferably is a silicate of the zeolite type.

The sheet silicate obtained according to the invention, as described in detail below, is characterized in that at least the following reflections occur in the corresponding X-ray diffraction pattern by Cu K alpha 1 radiation:

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.9-20.0 | wherein 100% relates to the intensity of the highest peak in the X-ray diffractogram.

The framework silicate obtained according to the invention, as described in detail below, is characterized in that at least the following reflections occur in the corresponding X-ray diffraction pattern by Cu K alpha 1 radiation:

| Intensity (%) | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 | wherein 100% relates to the intensity of the highest peak in the X-ray diffractogram.

Surprisingly, it was found that it is advantageous for the process for the preparation of the silicate if the silicate which results from the process according to the invention is added as a crystallization auxiliary in (1).

Thereby, it is possible firstly to use, the sheet silicate as a crystallization auxiliary as mentioned above and described in detail below. According to an embodiment of the process according to the invention, that sheet silicate which results after separation from the suspension obtained according to (2) is used here as crystallization auxiliary, wherein possible separation methods are described as step (3) in detail below. Before the use as a crystallization assistant in (1), the sheet silicate resulting after separation from the suspension obtained according to (2) can additionally either be suitably washed according to (4) and/or suitably dried according to (5), wherein (4) and (5) are described in detail below. According to a further embodiment of the process according to the invention, it is also possible for the suspension obtained from (2) to be used as a crystallization assistant at least partly without separating off the silicate present in the suspension.

Secondly, it is possible within the scope of the present invention to use the framework silicate as mentioned above and described in detail below as a crystallization auxiliary in (1). As described in detail below, the framework silicate can preferably be prepared by calcining the sheet silicate obtained according to (2) and optionally separated off according to (3) and
optionally washed according to (4) and/or dried according to (5)

in a suitable manner.

According to a further embodiment of the process according to the invention, a mixture of sheet silicate and framework silicate can also be employed as crystallization auxiliary.

Particularly preferably, the sheet silicate obtained according to (2) and optionally separated off according to (3) and optionally separated off according to (4) and/or dried according to (5) is employed as crystallization auxiliary.

The process according to the invention for the preparation of the silicate is preferably carried out as a batch process. When it is mentioned in the context of the present invention that the silicate obtained according to (2) or the framework silicate obtained therefrom in turn is employed in (1), preferably that the sheet silicate obtained according to (2) is employed in (1), this comprises embodiments according to which the silicate is prepared and a part thereof is used in a subsequent reaction batch in the same batch reactor as a crystallization assistant. It is also possible to use the silicate at least partly in a stage (1) which is carried out in a different batch reactor from the stage (1) from which the silicate was finally obtained.

It is also possible according to the invention for the silicate used in (1) to be prepared by another process. For example, a process in which no crystallization auxiliary, in particular no silicate, is employed in step (1) may be mentioned here, wherein otherwise the same conditions, such as, for example, the weight ratios of $SiO_2$:DMDPAH:$H_2O$, as described above, and/or the same crystallization conditions and/or the same separation conditions and/or the same drying conditions and/or the same calcination conditions as described in detail below are chosen.

Surprisingly, it was found for the present process that the addition of sheet and/or framework silicate as a crystallization auxiliary has an advantageous effect on the induction phase of the hydrothermal silicate synthesis and an acceleration of the crystallization is thus achieved.

In (1), the silicate is preferably added in an amount of from 0.1 to 5% by weight, based on silicon dioxide present in the mixture according to (1) and/or on silicon dioxide present in the silicon dioxide precursor in the mixture according to (1).

More preferably, the silicate in (1) is added in an amount of from 0.2 to 4.5% by weight, more preferably from 0.5 to 4.0% by weight, more preferably from 0.75 to 3.5% by weight, more preferably from 1.0 to 3.0% by weight, more preferably from 1.5 to 2.5% by weight.

According to a preferred embodiment, the silicate is added as a crystallization auxiliary to the mixture which is formed by mixing silicon dioxide and/or silicon dioxide precursor.

According to a possible embodiment of the present invention, the colloidal solution obtained in this manner according to (1) can be heated without a further intermediate step according to (2). It is also possible, if required, to stir the colloidal solution obtained in this manner according to (1) before the heating according to (2) in a suitable manner for a period of up to, for example, 12 h, preferably from 0.5 to 6 h and particularly preferably from 1 to 3 h.

According to a further embodiment, the colloidal solution obtained according to (1) and, if appropriate, stirred can be concentrated in a suitable manner before the heating according to (2). This concentrating is described below as step (ii).

In principle, it is possible to heat the colloidal solution obtained according to (1), optionally suitably stirred and/or optionally suitably concentrated, according to (2) under any suitable pressure and any suitable temperature, provided that it is ensured that at least one silicate crystallizes in the colloidal solution. Here, temperatures which, at the chosen pressure, are above the boiling point of the solution obtained according to (1) are preferred. Temperatures of up to 180° C. at atmospheric pressure are more preferred. According to a particularly preferred embodiment of the process according to the invention, the crystallization according to (2) is carried out in an autoclave.

The present invention accordingly also relates to a process as described above, wherein the hydrothermal crystallization in (2) is carried out in an autoclave.

The term "atmospheric pressure" as used in the context of the present invention designates a pressure of, ideally, 101 325 Pa, which, however, may be subject to variations within the limits known to the person skilled in the art. For example, the pressure may be in the range of from 95 000 to 106 000 or of from 96 000 to 105 000 or of from 97 000 to 104 000 or of from 98 000 to 103 000 or of from 99 000 to 102 000 Pa.

The temperature used in the autoclave according to (2) is preferably in the range of from 100 to 180° C., more preferably in the range of from 110 to 175° C., more preferably in the range of from 120 to 170° C., more preferably in the range of from 130 to 165° C. and particularly preferably in the range of from 140 to 160° C.

Accordingly, the present invention also relates to a process as described above, wherein the colloidal solution obtained according to (1), optionally after concentration as described above, is heated to a temperature in the range of from 100 to 180° C. according to (2) in an autoclave.

This temperature to which the colloidal solution obtained according to (1) is heated according to (2) can in principle be maintained until the crystallization has taken place to the desired extent. Here, time periods of up to 340 h, more preferably of up to 300 h, more preferably of 260 h, more preferably from 12 h to 260 h, more preferably from 24 h to 252 h, more preferably from 24 to 252 h, more preferably from 24 to 240 h, more preferably from 24 to 216 h, more preferably from 24 to 192 h, more preferably from 24 to 168 h, more preferably from 24 to 144 h, more preferably from 24 to 120 h, more preferably from 48 to 120 h and more preferably from 72 to 120 h are preferred.

In comparison to a process in which no silicate was added as a crystallization auxiliary in (1) and for which crystallization periods of from about 15 to 45 d are typical, a substantial reduction of the crystallization period to less than 15 d, for example to 11 d and even to 5 days or less could be achieved by the process according to the invention.

Accordingly, the present invention also relates to a process as described above, wherein the colloidal solution obtained according to (1), optionally after concentration as described above, is heated for a period in the range of from 12 h to 260 h according to (2).

In principle, any suitable compound can be used as silicon dioxide or a precursor thereof. In this context, colloidal silicon dioxide as well as so-called "wet-process silicon dioxide" as well as so-called "dry-process" silicon dioxide can be employed. In these cases, the silicon dioxide is particularly preferably amorphous, wherein the size of the silicon dioxide particles is, for example, in the range of from 5 to 100 nm and the surface area of the silicon dioxide particles is in the range of from 50 to 500 m²/g. Colloidal silicon dioxide is, inter alia, commercially available as Ludox®, Syton®, Nalco®, or Snowtex®. "Wet process" silicon dioxide is, inter alia, commercially available as Hi-Sil®, Ultrasil®, Vulcasil®, Santocel®, Valron-Estersil®, Tokusil® or Nipsil®. "Dry process" silicon dioxide is commercially available, inter alia, as Aerosil®, Reolosil®, Cab-O-Sil®, Fransil® or ArcSilica®. For example, tetraalkoxysilanes, such as, for example, tetraethoxysilane or tetrapropoxysilane, may be mentioned as precursor compound. Particularly preferably, no silicon dioxide precursor but silicon dioxide as such is employed in the process according to the invention. Amorphous silicon dioxide is preferred in turn.

Accordingly, the present invention also relates to a process as described above, wherein amorphous silicon dioxide is employed according to (1).

In principle, any suitable amorphous silicon dioxide can be used here. Amorphous silicon dioxide having a specific surface area (BET, Brunauer-Emmet-Teller; determined according to DIN 66131 by nitrogen adsorption at 77 K) in the range of from 10 to 400 m²/g, preferably in the range of from 10 to 100 m²/g and particularly preferably in the range of from 10 to 50 m²/g is preferred. Further preferred ranges are from 50 to 100 m²/g or from 100 to 300 m²/g or from 300 to 400 m²/g.

In addition to silicon dioxide, DMDPAH is very particularly preferably employed according to (1).

This compound can be prepared by any conceivable process. One possibility for the preparation is, for example, an electrochemical dialysis by means of a membrane. According to one embodiment of the process according to the invention, DMDPAH is obtained by reaction of dipropylamine and methyl iodide and subsequent anion exchange.

According to a further embodiment, dipropylamine and methyl iodide are reacted with one another in a suitable solvent or solvent mixture, preferably in ethanol. The temperature at which this reaction takes place is preferably in the range of from 20 to 75° C., more preferably in the range of from 30 to 60° C. and particularly preferably in the range of from 40 to 50° C.

According to a further embodiment of the process according to the invention, DMDPAH can be prepared starting from dimethylamine and propyl bromide in a suitable solvent, for example preferably ethanol, at a suitable temperature, for example preferably from 40 to 50° C.

The anion exchange according to the invention is preferably carried out after the respective ammonium hydroxide has been separated off, for example, by filtration, centrifuging or another solid-liquid separation method, for example preferably by filtration, and washed, for example, preferably with a suitable alcohol, such as, for example, ethanol, through a suitable ion exchange resin, such as, for example, an Amberlyst™ resin or a resin of the AG1-X8 type (BioRad). Ion exchange using $Ag_2O$ is also possible.

Commercially available DMDPAH, such as, for example, an aqueous DMDPAH solution from Sachem, can also be used in the process according to the invention.

DMDPAH is preferably used in (1) as a solution, particularly preferably as an aqueous solution, wherein the concentration of the aqueous solution with respect to DMDPAH is, for example, in the range of from 10 to 20% by weight.

The temperature during the preparation of the colloidal solution according to (1) is preferably in the range of from 10 to 40° C., more preferably in the range of from 15 to 35° C. and particularly preferably in the range of from 20 to 30° C.

According to one embodiment of the process according to the invention, a colloidal solution which comprises tetraalkylammonium hydroxide, silicon dioxide, water and crystallization auxiliary is initially prepared in a first step. In at least one second step, the water content of the solution obtained in the first step is then adjusted by means of a suitable method so that it is within the abovementioned preferred limits.

According to a suitable method preferred among others, the water content is adjusted by removing water in at least one suitable apparatus. The water is removed at a temperature in the range of, preferably, from 60 to 85° C., more preferably of from 65 to 80° C. and particularly preferably of from 65 to 75° C. This step is described above as concentration.

Accordingly, the present invention also relates to the process as described above, wherein, according to (1), (i) a colloidal solution which comprises tetraalkylammonium hydroxide (DMDPAH), silicon dioxide, water and silicate as a crystallization auxiliary is prepared, and (ii) the water content of the colloidal solution obtained according to (i) is adjusted so that a colloidal solution which comprises tetraalkylammonium hydroxide, silicon dioxide, water and silicate as crystallization auxiliary is obtained having a weight ratio of $SiO_2$:tetraalkylammonium hydroxide:water:silicate in the abovementioned preferred ranges, such as, for example, 1:(0.4-2):(4-8):(0.001-0.05).

Inter alia, rotary evaporators or ovens may be mentioned as at least one suitable apparatus. An oven is particularly preferred. Inter alia, apparatus which permit removal of water at reduced pressure and hence at low temperatures, such as, for example, rotary evaporators operated under reduced pressure, are preferred in this respect.

The heating and the subsequent preparation of the at least one silicate can be carried out in any suitable apparatus. For example, (2) is effected in an autoclave.

The colloidal solution is preferably suitably stirred for the crystallization according to (2). It is also possible to rotate the reaction vessel in which the crystallization is carried out.

According to one embodiment of the process according to the invention, the at least one silicate is separated off in a suitable manner in at least one step from the suspension obtained from (2). This separation can be effected, for example, by filtration, ultrafiltration, diafiltration or centrifuging methods or, for example, spray drying and spray granulation methods. Separation by means of spray drying or filtration is preferred. The suspension obtained according to (2) as such or the suspension obtained by concentrating the suspension obtained according to (2) can be subjected to the separation, for example separation by spray methods. The concentrating can be achieved, for example, by evaporating, as for example evaporating under reduced pressure, or by cross flow filtration. Likewise, the suspension obtained according to (2) can be concentrated by separating the suspension according to (2) into two fractions, wherein the solid contained in one of both fractions is separated off by filtration, ultrafiltration, diafiltration, or centrifugation methods and is suspended after an optional washing step and/or drying step in the other fraction of the suspension. The sprayed material, obtained by spray drying and spray granulation drying, such as fluidized-bed spray granulation drying, as separation and drying methods, can contain solid and/or hollow spheres, and can substantially consist of such spheres, respectively, which have, for example, a diameter in the range of from 5 to 500 µm or also 5 to 300 µm. Single component or multiple component nozzles can be used during spraying as spray nozzles. The use of a rotary atomizer is also conceivable. Possible inlet temperatures for the used carrier gas are, for example, in the range of from 200 to 600° C., preferably in the range of from 225 to 550° C., and more preferably in the range of from 300 to 500° C. The outlet temperature of the carrier gas is, for example, in the range of from 50 to 200° C. Air, lean air or oxygen-nitrogen mixtures with an oxygen content of up to 10 vol. %, preferably of up to 5 vol. %, more preferably of less than 5 vol. %, as, for example, of up to 2 vol. %, may be mentioned as carrier gases. The spray methods can be carried out in counter-current or co-current flow.

Accordingly, the present invention also relates to a process as described above, additionally comprising (3) separation of the at least one silicate from the suspension obtained according to (2).

According to one embodiment of the process according to the invention, the crystallization according to (2) can be stopped by suitable quenching. Here, it is particularly preferred to add water to the suspension, wherein the water has a temperature which is suitable for stopping the crystallization.

According to a preferred embodiment of the process according to the invention, the at least one silicate separated off as described above is washed and/or dried.

Accordingly, the present invention also relates to the process as described above, additionally comprising (4) washing and/or (5) drying of the silicate obtained according to (3).

The separation may be followed by at least one washing step and/or at least one drying step, wherein it is possible to use identical or different washing agents or mixtures of washing agents in the case of at least two of the washing steps and to use identical or different drying temperatures in the case of at least two drying steps.

The drying temperatures here are preferably in the range of from room temperature to 150° C., more preferably of from 60 to 140° C., more preferably of from 80 to 130° C. and more preferably in the range of from 100 to 120° C.

The durations of drying are preferably in the range of from 6 to 48 h, more preferably of from 12 to 36 h.

Accordingly, the present invention also relates to the process as described above, wherein the silicate is washed according to (4) with water and/or dried according to (5) at a temperature in the range of from room temperature to 150° C.

Washing agents used may be, for example, water, alcohols, such as, for example, methanol, ethanol or propanol, or mixtures of two or more thereof. For example, mixtures of two or more alcohols, such as, for example, methanol and ethanol or methanol and propanol or ethanol and propanol or methanol and ethanol and propanol, or mixtures of water and at least one alcohol, such as, for example, water and methanol or water and ethanol or water and propanol or water and methanol and ethanol or water and methanol and propanol or water and ethanol and propanol or water and methanol and ethanol and propanol, may be mentioned as mixtures. Water or a mixture of water and at least one alcohol, preferably water and ethanol, is preferred, wherein water as the sole washing agent is very particularly preferred.

According to an embodiment of the process of the invention, the mother liquor obtained from the separation of the at least one silicate according to (3) and which optionally contains unreacted starting materials, can be recycled into step (1) of the process.

The separation carried out, for example, by means of spray drying methods or spray granulation methods, as described above, has the advantage that the separation of the silicates from the suspension obtained according to (2) and the drying of the silicates can be carried out in a single step.

In the process according to the invention, a silicate, in particular a sheet silicate, is obtained.

Accordingly, the present invention also relates to a silicate, in particular a sheet silicate, obtainable by the process described above.

The present invention also relates to the sheet silicate per se, wherein, in the X-ray diffraction pattern by Cu K alpha 1 radiation, at least the following reflections occur (structure RUB-39):

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.9-20.0 | wherein 100% relates to the intensity of the highest peak in the X-ray diffractogram.

In particular, the present invention relates to the sheet silicate per se, wherein, in the X-ray diffraction pattern by Cu K alpha 1 radiation, at least the following reflections occur (structure RUB-39):

| Intensity (%) | Diffraction angle 2θ/° [Cu K(alpha 1)] |
|---|---|
| 100 | 8.0-8.4 |
| 11-21 | 11.0-11.4 |
| 13-23 | 13.2-13.6 |
| 5-15 | 18.0-18.4 |
| 7-17 | 18.4-18.8 |
| 19-29 | 19.8-20.2 |
| 20-30 | 22.0-22.35 |
| 6-16 | 22.36-22.7 |
| 23-33 | 23.3-23.59 |
| 22-32 | 23.60-23.8 | wherein 100% relates to the intensity of the highest peak in the X-ray diffractogram.

The sheet silicates according to the invention or prepared according to the invention are preferably present in space group P 2/c. Where tetraalkylammonium hydroxide and silicon dioxide and/or silicon dioxide precursor were used as starting materials, as described above, the sheet silicates prepared according to the invention preferably have the following lattice parameters, determined by Rietveld analysis:

a=7.33(1) Å
b=10.72(1) Å
c=17.51(1) Å
beta=115.7(1)°.

The Rietveld analysis is described in R. A. Young (editor), The Rietveld Method, Oxford University Press, 1995, Oxford, in particular in chapter 7: Analytical profile fitting of X-ray powder diffraction profiles in Rietveld analysis, pages 111-131.

According to 29-Si MAS NMR spectroscopy, the sheet silicates according to the invention have a low-field signal at about 104 ppm, which is characteristic of a silanol group typical of sheet silicates.

According to 1-H NMR spectroscopy, the sheet silicates according to the invention have a low-field signal at about 16.4 ppm, which is characteristic of a silanol group typical of sheet silicates.

The stated chemical shifts are based on TMS as an internal standard.

According to a particularly preferred embodiment of the process according to the invention, the silicate obtained according to (2) is calcined according to (6) in at least one additional step.

It is possible in principle to feed the suspension comprising the at least one silicate directly to the calcination. Preferably, the silicate is separated from the suspension, as described above, according to (3), before the calcination.

Prior to the calcination, the silicate separated from the suspension can be subjected to at least one washing step (4) as described above and/or at least one drying step (5) as described above. Preferably, the silicate separated from the suspension is dried and is fed to the calcination without washing step.

The calcination according to (6) of the silicate obtained according to (2) and/or (3) and/or (4) and/or (5) is preferably effected at a temperature in the range of up to 600° C. to give a framework silicate.

According to a preferred embodiment of the process according to the invention, the silicate is heated thereby from room temperature to a temperature of up to 600° C., wherein, more preferably, the heating rate is in the range of from 0.1 to 12° C./h, more preferably of from 1 to 11° C./h and particularly preferably in the range of from 5 to 10° C./h.

This temperature is preferably, for example, in the range of from 200 to 600° C. Calcination temperatures in the range of from 300 to 600° C. are particularly preferred. More preferably, the calcinations temperatures are in the range of from 400 to 575° C., particularly preferably in the range of from 450 to 550° C.

According to a possible embodiment of the process according to the invention, the calcination is carried out stepwise at successive temperatures. The term "stepwise at successive temperatures" as used in the context of the present invention designates a calcination in which the silicate to be calcined is heated to a certain temperature, kept at this temperature for a certain time and heated from this temperature to at least one further temperature and kept there in turn for a certain time.

Preferably, the silicate to be calcined is kept at up to 4 temperatures, more preferably at up to 3 temperatures and particularly preferably at 2 temperatures.

In this respect, the first temperature is preferably in the range of from 500 to 540° C., more preferably in the range of from 505 to 535° C., more preferably in the range of from 510 to 530° C. and particularly preferably in the range of from 515 to 525° C. This temperature is preferably maintained for a time in the range of from 8 to 24 h, more preferably of from 9 to 18 h and in particular of from 10 to 14 hours.

The second temperature is preferably in the range of from greater than 540 to 600° C., more preferably in the range of from 550 to 580° C. and particularly preferably in the range of from 555 to 570° C. This temperature is preferably maintained for a time in the range of from 0.5 to 6 h, more preferably of from 1 to 4 h and in particular of from 1 to 3 hours.

Accordingly, the present invention also relates to a process as described above, wherein the calcination is effected stepwise at successive temperatures in the range of up to 600° C., preferably from 300 to 600° C.

The calcination can be carried out in any suitable atmosphere, such as, for example, air, lean air, nitrogen, water steam, synthetic air, carbon dioxide. The calcination is preferably carried out under air.

The calcination can be carried out in any apparatus suitable for this purpose. The calcination is preferably effected in a rotating tube, in a belt calciner, in a muffle furnace, in situ in an apparatus in which the silicate is subsequently used for the intended purpose, for example as a molecular sieve, catalyst, or for another application described below. Here, a rotating tube and a belt calciner are particularly preferred.

According to a further possible embodiment of the present invention, according to which the silicate obtained according to (2) is separated off from the suspension by means of spray drying methods or spray granulation methods, the conditions employed during the separation are chosen so that during the separation at least a portion of the sheet silicates is converted to the framework silicate. Thereby, during the separation, temperatures are chosen which are preferably at least 225° C. This version of the process has the advantage that the separation step, the drying step and at least partly the calcination step can be combined to a single step.

In the process according to the invention, a silicate, in particular a framework silicate, is obtained after calcination.

Accordingly, the present invention also relates to the process as described above, additionally comprising
(6) calcination of the silicate obtained according to (2) and
   optionally separated off according to (3) and
   optionally washed according to (4) and/or dried according to (5)
to give a framework silicate.

Accordingly, the present invention also relates to a silicate, in particular a framework silicate, obtainable by the process described above, comprising the calcination according to (6), in particular the framework silicate, obtainable using DMDPAH.

The present invention also relates to the framework silicate per se, wherein, in the X-ray diffraction pattern by Cu K alpha 1 radiation, at least the following reflections occur (structure RUB-41):

| Intensity (%) | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 | wherein 100% relates to the intensity of the highest peak in the X-ray diffractogram.

In particular, the present invention relates to the framework silicate per se, wherein, in the X-ray diffraction pattern by Cu K alpha 1 radiation, at least the following reflections occur (structure RUB-41):

| Intensity (%) | Diffraction angle 2θ/° [Cu K(alpha 1)] |
|---|---|
| 100 | 9.8-10.2 |
| 24-34 | 11.0-11.4 |
| 9-19 | 15.5-15.9 |
| 12-22 | 19.4-19.6 |
| 19-29 | 19.6-19.8 |
| 8-18 | 26.2-<26.3 |
| 8-18 | 26.3-<26.4 |
| 13-23 | 26.4-26.6 | wherein 100% relates to the intensity of the highest peak in the X-ray diffractogram.

The framework silicates according to the invention or prepared according to the invention are preferably present in the space group P 2/c. Where tetraalkylammonium hydroxide and silicon dioxide and/or silicon dioxide precursor were used as starting materials as described above, the framework silicates prepared according to the invention preferably have the following lattice parameters, determined by Rietveld analysis:
   a=7.34(1) Å
   b=8.72(1) Å
   c=17.17(1) Å
   beta=114.2(1)°.

According to 29-Si MAS NMR spectroscopy, the low-field signal at about 104 ppm, which is characteristic of a silanol group typical of sheet silicates and is found in the case of the above-described sheet silicates according to the invention, is absent in the case of the framework silicates according to the invention.

The framework silicates according to the invention preferably have 8 MR and 10 MR channels, wherein the 8 MR channels are particularly preferably parallel to c of the unit cell as stated above, and wherein the 10 MR channels are particularly preferably parallel to a of the unit cell as stated above. Regarding the definition of the 8 MR and 10 MR channels, reference may be made to Ch. Baerlocher, W. M. Meier, D. H. Olson, Atlas of Zeolite Framework Types, $5^{th}$ edition, 2001, Elsevier, pages 10-15.

In particular, the framework silicates according to the invention are characterized by a substantially monomodal distribution with regard to the two-dimensional 8 MR and 10 MR channel pore structure. The pore openings of the 8 MR channels and the 10 MR channels each have an area preferably in the range of $(5.70-6.00) \times (4.00-4.20)$ Å$^2$, particularly preferably of $(5.80-5.90) \times (4.05-4.15)$ Å$^2$, in this respect.

The framework silicates according to the invention preferably have micropores having a specific surface area in the range of greater than 200 m$^2$/g, more preferably of from greater than 200 to 800 m$^2$/g, more preferably of from 300 to 700 m$^2$/g and particularly preferably of from 400 to 600 m$^2$/g, determined in each case according to DIN 66135 (Langmuir).

The framework silicates according to the invention preferably have pores having a pore volume in the range of from 0.15 to 0.21 ml/g, more preferably from 0.16 to 0.20 ml/g and particularly preferably from 0.17 to 0.19 ml/g determined in each case according to DIN 66134.

Accordingly, the framework silicates according to the invention are silicates of a microporous zeolite type.

The thermal stability of the framework silicates according to the invention is preferably at least 600° C., more preferably more than 600° C.

The term "thermal stability" as used in this context in the present invention designates the temperature at which the specific lattice structure of the framework silicate is retained under atmospheric pressure.

According to further embodiments of the present invention, it is possible for the silicates prepared according to the invention to comprise at least one atom of at least one other element in addition to silicon and oxygen. It is thus possible to incorporate at least one atom of at least one of the elements aluminum, boron, iron, titanium, tin, germanium, zirconium, vanadium or niobium into the silicate structure.

It is also conceivable to introduce 2, 3 or more heteroatoms being different from each other. In this context, for example, the combinations aluminum and boron, aluminum and tin, aluminum and titanium, aluminum and germanium, aluminum and vanadium, aluminum and zirconium, boron and tin, boron and titanium, boron and germanium, boron and vanadium, boron and zirconium, or also combinations of, for example, 3 different heteroatoms, may be mentioned.

If, for example, aluminum is incorporated, for example metallic aluminum as, for example, aluminum powder, or suitable aluminates, such as, for example, alkali metal aluminates, and/or aluminum alcoholates, such as, for example, aluminum triisopropylate, can be used as starting materials in addition to the tetraalkylammonium compound and the silicon dioxide and/or silicon dioxide precursor.

For incorporation of aluminum, sodium aluminate, inter alia, is preferably used as aluminum source. More preferably, the aluminum source is employed in such quantity that the molar ratio of Al:Si in the silicate according to the invention, particularly in the framework silicate according to the invention, is in the range of from 1:15 to 1:80, more preferably in the range of from 1:20 to 1:70 and more preferably in the range of from 1:25 to 1:60. For incorporation of aluminum, the addition of alkaline metal ions or earth alkaline metal ions, further preferably of alkaline metal ions and particularly preferably of sodium ions is particularly preferred. Surprisingly, it was found that upon addition of these ions, the temperature during the hydrothermal crystallization can be reduced. If, for example, the conventional temperature of a hydrothermal synthesis is about 150° C., by addition of sodium ions according to the invention, a temperature reduction of about 10° C. can be achieved yielding in an economically superior process. At the same time, the short crystallization period of the invention is maintained.

If, for example, boron is incorporated, for example free boric acid and/or borates and/or boric esters, such as, for example, triethyl borate or trimethyl borate, can be used as starting materials in addition to the tetraalkylammonium compound and the silicon dioxide and/or silicon dioxide precursor.

Preferably, for incorporation of boron, for example, boric acid is used as boron source. The boron source is preferably used in such quantity that the molar ratio of B:Si in the silicate of the invention, particularly in the framework silicate of the invention, is in the range of from 1:5 to 1:50, more preferably in the range of from 1:10 to 1:45 and more preferably in the range of from 1:15 to 1:40. The water content of the mixture to be hydrothermally crystallized is preferably in the range of from about 0.1 to about 1.0 based on Si, expressed as molar ratio (Si:water). Based on Si, the DMDPAH contents of the mixture to be hydrothermally crystallized are preferably in the range of from about 1.5 to about 2.5, expressed as molar ratio Si:DMDPAH.

If, for example, titanium is incorporated, for example titanium alcoholates, such as, for example, titanium ethanolates or titanium propylates, can be used as starting materials in addition to the tetraalkylammonium compound and the silicon dioxide and/or silicon dioxide precursor.

If, for example, tin is incorporated, for example tin chlorides and/or organometallic tin compounds, such as, for example, tin alcoholates, or chelates such as, for example, tin acetylacetonates, can be used as starting materials in addition to the tetraalkylammonium compound and the silicon dioxide and/or silicon dioxide precursor.

If, for example, zirconium is incorporated, for example zirconium chloride and/or zirconium alcoholates can be used as starting materials in addition to the tetraalkylammonium compound and the silicon dioxide and/or silicon dioxide precursor.

If, for example, vanadium or germanium or niobium is incorporated, for example vanadium chloride or germanium chloride or niobium chloride can be used as starting materials in addition to the tetraalkylammonium compound and the silicon dioxide and/or silicon dioxide precursor.

Accordingly, the present invention also relates to a process as described above and the sheet and/or framework silicates as described above, in particular the framework silicates as described above, wherein the silicates comprise at least one of the elements Al, B, Fe, Ti, Sn, Ge, Zr, V or Nb in addition to Si and O.

Depending on the type of atoms which are incorporated into the lattice, the result may be a negatively charged framework which makes it possible, for example, to load the silicate with cations. Inter alia, the ammonium ions $R_1R_2R_3R_4N^+$ of the template compounds, platinum, palladium, rhodium or ruthenium cations, gold cations, alkali metal cations, such as, for example, sodium or potassium ions, or alkaline earth metal cations, such as, for example, magnesium or calcium ions, may be mentioned as such. Likewise, for example, molybdenum, wolfram, rhenium or silver may be mentioned in this context. Accordingly, it is possible both to load the silicates obtained according to the invention having the RUB-39 and/or RUB-41 structure, which contain only silicon, and also the silicates, described above, containing at least one heteroatom.

In many industrial applications, it is often desired on the part of the user to employ not the crystalline material per se but the crystalline material processed to give moldings. Such moldings are required particularly in many industrial processes in order to be able expediently to operate, for example, separations of substances from mixtures of substances in, for example, tubular reactors.

Accordingly, the present invention also relates to a molding comprising the crystalline, microporous framework silicate described above. The present invention also comprises moldings comprising the sheet silicate described above.

In general, the molding may comprise all conceivable further compounds in addition to the framework silicate according to the invention, provided that it is ensured that the resulting molding is suitable for the desired application.

According to an embodiment, the molding according to the invention is prepared by one of the below-described processes for the preparation of moldings without using a binder. The term "binder" as used in the context of the present invention designates a binder which remains in the molding either in its original form or, after calcination of the molding as described below, in converted form.

In the present invention, it is preferable if at least one suitable binder is used in the production of the molding. In this preferred embodiment, more preferably a mixture of framework silicate and the at least one binder is prepared.

Accordingly, the present invention also describes a process for the preparation of a molding, comprising a framework silicate as described above, comprising the preparation of a framework silicate according to the process described above and the step (I) preparation of a mixture comprising the framework silicate as described above or a framework silicate obtainable by a process as described above, and at least one binder.

In general, all compounds which impart adhesion and/or cohesion between the framework silicate particles to be bonded which goes beyond the physisorption which may be present without a binder are suitable as binders. Examples of such binders are metal oxides, such as, for example, $SiO_2$, $Al_2O_3$, $TiO_2$, $ZrO_2$ or $MgO$ or clays or mixtures of two or more of these compounds.

Clay minerals and naturally occurring or synthetically produced aluminas, such as, for example, alpha-, beta-, gamma-, delta-, eta-, kappa-, chi- or theta-alumina and their inorganic or organometallic precursor compounds, such as, for example, gibbsite, bayerite, boehmite or pseudoboehmite or trialkoxyaluminates, such as, for example, aluminum triisopropylate, are particularly preferred as $Al_2O_3$ binders. Further preferred binders are amphiphilic compounds having a polar and a nonpolar moiety and graphite. Further binders are, for example, clays, such as, for example, montmorillonites, kaolins, metakaolins, hectorite, bentonites, halloysites, dickites, nacrites or anaxites.

These binders can be used as such. It is also possible within the scope of the present invention to use compounds from which the binder is formed in at least one further step in the production of the moldings. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate.

In the context of the present invention binders which either completely or partly comprise $SiO_2$ or which are a precursor of $SiO_2$, from which $SiO_2$ is then formed in at least one further step in the preparation of the moldings, are very particularly preferred. In this context, colloidal silica as well as so-called "wet process" silica as well as so-called "dry process" silica can be employed. Particularly preferably, this silica is amorphous silica, the size of the silica particles being, for example, in the range of from 5 to 100 nm and the surface area of the silica particles being in the range of from 50 to 500 $m^2/g$.

Colloidal silica, preferably as an alkaline and/or ammoniacal solution, more preferably as an ammoniacal solution, is commercially available, inter alia, for example as Ludox®, Syton®, Nalco® or Snowtex®.

"Wet process" silica is commercially available, inter alia, for example as Hi-Sil®, Ultrasil®, Vulcasil®, Santocel®, Valron-Estersil®, Tokusil® or Nipsil®.

"Dry process" silica is commercially available, inter alia, for example as Aerosil®, Reolosil®, Cab-O-Sil®, Fransil® or ArcSilica®.

Inter alia, an ammoniacal solution of colloidal silica is preferred in the present invention.

Accordingly, the present invention also describes a molding, as described above, additionally comprising $SiO_2$ as binder.

The present invention also relates to a process, as described above, wherein the binder used according to (I) is a binder comprising or forming $SiO_2$.

Accordingly, the present invention also describes a process, as described above, wherein the binder is a colloidal silica.

The binders are preferably used in an amount which leads to finally resulting moldings having a binder content in the range of up to 80% by weight, more preferably in the range of from 5 to 80% by weight, more preferably in the range of from 10 to 70% by weight, more preferably in the range of from 10 to 60% by weight, more preferably in the range of from 15 to 50% by weight, more preferably in the range of from 15 to 45% by weight and particularly preferably in the range of from 15 to 40% by weight, based in each case on the total weight of the finally resulting molding.

The term "finally resulting molding", as used in the context of the present invention, designates a molding as obtained from the drying and calcination stages (IV) and/or (V), preferably (IV) and (V) and particularly preferably (V) as described below.

At least one further compound can be added to the mixture of binder or binder-precursor and the zeolite material, for further processing and for the formation of a plastic material. Inter alia, pore formers may preferably be mentioned here.

Pore formers which may be used in the process according to the invention are all compounds which, with regard to the molding produced, provide a certain pore size and/or a certain pore size distribution and/or certain pore volumes.

Pore formers preferably used in the process according to the invention are polymers which are dispersible, suspendable or emulsifiable in water or in aqueous solvent mixtures. Preferred polymers here are polymeric vinyl compounds, such as, for example, polyalkylene oxides, such as polyethylene oxides, polystyrene, polyacrylates, polymethacrylates, polyolefins, polyamides and polyesters, carbohydrates, such as, for example, cellulose or cellulose derivatives, such as, for example, methyl cellulose, or sugars or natural fibers. Further suitable pore formers are, for example, pulp or graphite.

If pore formers are used in the preparation of the mixture according to (I) the content of pore former, preferably polymer, in the mixture according to (I) is preferably in the range of from 5 to 90% by weight, preferably in the range of from 15 to 75% by weight and particularly preferably in the range of from 25 to 55% by weight, based in each case on the amount of framework silicate according to the invention in the mixture according to (I).

If desired for the pore size distribution to be achieved, a mixture of two or more pore formers may also be used.

In a particularly preferred embodiment of the process according to the invention, as described below, the pore formers are removed in a step (V) by calcination to give the porous molding. According to a preferred embodiment of the process according to the invention, moldings which have pores, determined according to DIN 66134, in the range of at least 0.6 ml/g, preferably in the range of from 0.6 to 0.8 ml/g and particularly preferably in the range of from more than 0.6 ml/g to 0.8 ml/g are obtained.

The specific surface area of the molding according to the invention, determined according to DIN 66131, is in general at least 350 $m^2/g$, preferably at least 400 $m^2/g$ and particularly preferably at least 425 $m^2/g$. For example, the specific surface area may be in the range of from 350 to 500 $m^2/g$ or from 400 to 500 $m^2/g$ or from 425 to 500 $m^2/g$.

Accordingly, the present invention also describes a molding, as described above, having a specific surface area of at least 350 $m^2/g$, comprising pores having a pore volume of at least 0.6 ml/g.

In a likewise preferred embodiment of the process according to the invention, at least one pasting agent is added in the preparation of the mixture according to (I).

Pasting agents which may be used are all compounds suitable for this purpose. These are preferably organic, in particular hydrophilic polymers, such as, for example, cellulose, cellulose derivatives, such as, for example, methyl cellulose, starch, such as, for example, potato starch, wallpaper plaster, polyacrylates, polymethacrylates, polyvinyl alcohol, polyvinylpyrrolidone, polyisobutene or polytetrahydrofuran.

In particular, compounds which also act as pore formers can accordingly be used as pasting agents.

In a particularly preferred embodiment of the process according to the invention, as described below, these pasting agents are removed in a step (V) by calcination to give the porous molding.

According to a further embodiment of the present invention, at least one acidic additive is added during the preparation of the mixture according to (I). Organic acidic compounds which can be removed by calcination in the preferred step (V), as described below, are very particularly preferred. Carboxylic acids, such as, for example, formic acid, oxalic acid and/or citric acid, are particularly preferred. It is also possible to use two or more of these acidic compounds.

The order of addition of the components of the mixture according to (I) comprising the framework silicate is not critical. It is possible both first to add the at least one binder then the at least one pore former, the at least one acidic compound and finally the at least one pasting agent and to interchange the sequence with regard to the at least one binder, the at least one pore former, the at least one acidic compound and the at least one pasting agent.

After the addition of the binder to the framework silicate solid, to which, if appropriate, at least one of the compounds described above had already been added, the mixture according to (I) is as a rule homogenized for from 10 to 180 minutes. Inter alia, kneaders, edge mills or extruders are particularly preferably used for the homogenization. The mixture is preferably kneaded. On an industrial scale, grinding in an edge mill is preferred for the homogenization.

Accordingly, the present invention also describes a process for the production of a molding, comprising a framework silicate as described above, comprising the preparation of a framework silicate by the process described above and the steps (I) preparation of a mixture comprising the framework silicate as described above or a framework silicate obtainable by a process as described above, and at least one binder;
(II) kneading of the mixture.

The homogenization is as a rule carried out at temperatures in the range of from about 10° C. to the boiling point of the pasting agent and atmospheric pressure or slightly superatmospheric pressure. Optionally, at least one of the compounds described above can then be added. The mixture thus obtained is homogenized, preferably kneaded, until an extrudable plastic material has formed.

According to a more preferred embodiment of the present invention, the homogenized mixture is molded.

In the context of the present invention, preferred methods for the shaping methods are those in which the molding is effected by extrusion in conventional extruders, for example to give extrudates having a diameter of, preferably, from 1 to 10 mm and particularly preferably from 2 to 5 mm. Such extrusion apparatuses are described, for example, in Ullmann's Enzyklopädie der Technischen Chemie, 4$^{th}$ edition, vol. 2, page 295 et seq., 1972. In addition to the use of an extruder, an extrusion press is also preferably used for the molding.

In principle, however, all known and/or suitable kneading and molding apparatuses and methods may be used for the shaping. Inter alia, the following methods may be mentioned here:
(a) briquetting, i.e. mechanical compression with or without addition of additional binder;
(b) pelleting, i.e. compacting by circular and/or rotary movements;
(c) sintering, i.e. the material to be molded is subjected to a thermal treatment;
(d) hot isostatic pressing.

For example, the shaping can be selected from the following group, wherein the combination of at least two of these methods is explicitly included: briquetting using a ram press, roll press or ring roll press, briquetting without a binder; pelleting, melting, spinning techniques, deposition, foaming, spray drying; calcining in a shaft furnace, convection oven, traveling grate or rotary kiln, grinding in an edge mill.

The compacting can take place at ambient pressure or at a pressure higher than ambient pressure, for example in a pressure range of from 1 bar to several hundred bar. Furthermore, the compacting can take place at ambient temperature or at a temperature higher than ambient temperature, for example in a temperature range of from 20 to 300° C. If drying and/or calcining are part of the shaping step, temperatures of up to 600° C. are conceivable. Finally, the compacting can take place in the ambient atmosphere or in a controlled atmosphere. Controlled atmospheres are, for example, inert gas atmospheres, reducing atmospheres and/or oxidizing atmospheres.

Accordingly, the present invention also describes a process for the preparation of a molding, comprising a framework silicate as described above, comprising the preparation of a framework silicate by the process described above and the steps (I) preparation of a mixture comprising the framework silicate as described above or a framework silicate obtainable by a process as described above, and at least one binder;
(II) kneading of the mixture;
(III) molding of the kneaded mixture to give at least one molding.

The shape of the moldings produced according to the invention can be chosen as desired. In particular, inter alia, spheres, oval shapes, cylinders or tablets are possible. Likewise, hollow structures, as for example hollow cylinders or honeycomb structures or also star-shaped geometries may be mentioned.

In the present invention, the molding is particularly preferably carried out by extrusion of the kneaded mixture obtained according to (II), wherein the extrudates obtained more preferably are substantially cylindrical extrudates having a diameter in the range of from 1 to 20 mm, preferably in the range of from 1 to 10 mm, more preferably in the range of from 2 to 10 mm and more preferably in the range of from 2 to 5 mm.

In the present invention, step (III) is preferably followed by at least one drying step. This at least one drying step is carried out at temperatures in the range of in general from 80 to 160° C., preferably of from 90 to 145° C. and particularly preferably of from 100 to 130° C., the duration of drying generally being 6 h or more, for example in the range of from 6 to 24 h. However, depending on the moisture content of the material to be dried, shorter drying times, such as, for example, about 1, 2, 3, 4 or 5 h are also possible.

Before and/or after the drying step, the preferably obtained extrudate can, for example, be comminuted. Preferably granules or chips having a particle diameter of from 0.1 to 5 mm, in particular of from 0.5 to 2 mm, are obtained thereby.

Accordingly, the present invention also relates to a process for the preparation of a molding, comprising a framework silicate as described above, comprising the preparation of a framework silicate by the process described above and the steps (I) preparation of a mixture comprising the framework silicate as described above or a framework silicate obtainable by a process as described above, and at least one binder material;
(II) kneading of the mixture;
(III) molding of the kneaded mixture to give at least one molding;
(IV) drying of the at least one molding.

In the present invention, step (IV) is preferably followed by at least one calcination step. The calcination is carried out at temperatures in the range of in general from 350 to 750° C. and preferably from 450 to 600° C.

The calcination can be effected under any suitable gas atmosphere, wherein air and/or lean air are preferred. Furthermore, the calcination is preferably carried out in a muffle furnace, a rotary tube furnace and/or a belt calcining furnace, wherein the duration of calcination is in general 1 h or more, for example in the range of from 1 to 24 h or in the range of from 3 to 12 h. In the process according to the invention, it is accordingly possible, for example, to calcine the molding once, twice or more often for in each case at least 1 h, such as, for example, in each case in the range of from 3 to 12 h, wherein it is possible for the temperatures during a calcination step to remain constant or to be changed continuously or discontinuously. If calcination is effected twice or more often, the calcination temperatures in the individual steps may be different or identical.

Accordingly, the present invention also describes a process for the preparation of a molding, comprising a framework silicate as described above, comprising the preparation of a framework silicate by the process described above and the steps (I) preparation of a mixture comprising the framework silicate as described above or a framework silicate obtainable by a process as described above, and at least one binder material;
(II) kneading of the mixture;
(III) molding of the kneaded mixture to give at least one molding;
(IV) drying of the at least one molding;
(V) calcination of the at least one dried molding.

After the calcination step, the calcined material can, for example, be comminuted. Preferably, granules or chips having a particle diameter of from 0.1 to 5 mm, in particular of from 0.5 to 2 mm, are obtained thereby.

Before and/or after the drying and/or before and/or after the calcination, the at least one molding can, if appropriate, be treated with a concentrated or dilute Broenstedt acid or a mixture of two or more Broenstedt acids. Suitable acids are, for example, hydrochloric acid, sulfuric acid, phosphoric acid, nitric acid or carboxylic acids, dicarboxylic acids or oligo- or polycarboxylic acids, such as, for example, nitrilotriacetic acid, sulfosalicylic acid or ethylenediaminotetraacetic acid.

Optionally, this at least one treatment with at least one Broenstedt acid is followed by at least one drying step and/or at least one calcination step, which in each case is carried out under the conditions described above.

According to a further embodiment of the process according to the invention, the moldings obtained according to the invention can be subjected to a steam treatment for better hardening, after which preferably drying is effected again at least once and/or calcining at least once. For example, after at least one drying step and at least one subsequent calcination step, the calcined molding is subjected to the steam treatment and is then again dried at least once and/or calcined at least once.

The moldings obtained according to the invention have hardnesses which are in general in the range of from 1 to 20 N, as for example of from 2 to 15 N, preferably in the range of from 5 to 15 N and particularly preferably in the range of from 10 to 15 N.

Accordingly, the present invention also relates to a molding, as described above, having a cutting hardness in the range of from 2 to 15 N.

In the present invention, the hardness described above was determined on an apparatus from Zwick, type BZ2.5/TS1S with a preliminary force of 0.5 N, a shear rate under preliminary force of 10 mm/min and a subsequent testing rate of 1.6 mm/min. The apparatus had a fixed turntable and freely movable ram with built-in blade of 0.3 mm thickness. The movable ram with the blade was connected to a load cell for force pick-up and, during the measurement, moved toward the fixed turntable on which the catalyst molding to be investigated lay. The tester was controlled by means of a computer which registered and evaluated the results of the measurements. The values obtained are the mean value of the measurements for 10 catalyst moldings in each case. The catalyst moldings had a cylindrical geometry, their mean length corresponding approximately to twice to three times the diameter, and were loaded with the 0.3 mm thick blade with increasing force until the molding had been cut through. The blade was applied to the molding perpendicularly to the longitudinal axis of the molding. The force required for this purpose is the cutting hardness (unit N).

In the context of the present invention, it is also conceivable that a molding according to the invention is prepared starting with the sheet silicate obtained according to the invention. This sheet silicate can also be employed in step (I), which was described above in the context of the use of the framework silicate, either instead of the framework silicate or together with the framework silicate.

Thereby, it is conceivable, on the one hand that the sheet silicate, prior to use in (I), as described above, is separated according to (3) from the suspension obtained from the hydrothermal synthesis, wherein prior to the use in (1), washing and/or drying according to (4)/(5) may follow.

On the other hand it is conceivable that the sheet silicate is not separated off prior to the use in (I), but that the suspension obtained according to (2) comprising the sheet silicate is employed as such or in concentrated form. This process mode has the advantage that, for example, no additional or less pasting agent, for example, preferably water, has to be employed for the preparation of the moldable paste to be molded. Should such a concentrated suspension be used in the context of the present invention, the solid content of this suspension could be, for example, in the range of from 10 to 50 weight-%. The concentrating can, for example, be achieved by evaporating the suspension obtained according to (2), by cross-flow-filtration, for example under reduced pressure, or by dividing the suspension obtained according to (2), separating off the sheet silicate from one part of the suspension, optionally followed by drying and/or washing, and suspending the sheet silicate separated off in the remaining part of the suspension.

A possible advantage of both alternatives is that by drying and calcinations of the molding, which was prepared using the sheet silicate at suitable temperatures, the framework silicate may be formed in the molding and, thus, in comparison to the above described process, an energy-consuming calcination step, namely the calcination step for the preparation of the framework silicate prior to the use of the silicates in (I), can be omitted.

The present invention moreover relates to the use of the silicates according to the invention, in particular of the framework silicates according to the invention and/or of the moldings according to the invention, as a molecular sieve, catalyst, catalyst support or binder thereof, as adsorbents, pigments, additives in washing agents, an additive to building materials, for imparting thixotropic properties to color pastes and finishes, and for uses as antifriction agents and lubricants, as flameproofing agents, auxiliary agents and fillers in paper products, in bactericidal and/or fungicidal and/or herbicidal compositions, for ion exchange, for the preparation of ceramics, in polymers, in electrical, optical or electrooptical components and switch elements or sensors.

Reactions which can be catalyzed by the silicates according to the invention are, for example, hydrogenations, dehydrogenations, oxydehydrogenations, oxidations, epoxidations, polymerization reactions, aminations, hydrations and dehydrations, nucleophilic and electrophilic substitution reactions, addition and elimination reactions, double-bond and skeletal isomerizations, dehydrocyclizations, hydroxylations of heteroaromatics, epoxide-aldehyde rearrangements, metatheses, olefin preparation from methanol, Diels-Alder reactions, formation of carbon-carbon double bonds, such as, for example, olefin dimerization or olefin trimerization, and condensation reactions of the aldol condensation type. Depending on the molecule to be reacted, the catalytic reactions can be carried out in the gas or liquid phase or in the supercritical phase.

The silicates according to the invention are also particularly suitable as a molecular sieve. Here, the large internal surface area of the material according to the invention can be advantageously utilized to separate molecules from one another on the basis of their difference in the molecular size. Depending on the separation task, the respective adsorption can take place in the gas phase or the liquid phase or in the supercritical phase.

In a first embodiment, the silicates according to the invention are suitable for separating constitutional isomers, for example for separating n- and iso-isomers of small molecules. In the context of the present invention, the term "small molecule" is understood as molecules having a kinetic diameter in the range of from 3.5 to 5.5 Å. For the definition of the kinetic diameter, reference may be made to D. W. Breck, Zeolite Molecular Sieves, 1974, J. Wiley, pages 634-641.

As an example, the separation of n-butane and isobutane may be mentioned.

In a second embodiment, the silicates according to the invention are suitable for separating configurational isomers, for example for separating cis-butene and trans-butene.

According to a third embodiment, the silicates according to the invention, particularly the framework silicates and more particularly the framework silicates containing no heteroatom, are useful for the separation of olefins in the liquid phase. Surprisingly, it was found that such separations can be carried out successfully, especially using compounds having a kinetic diameter which is greater than or equal to the pore size of the silicate. In this context, for instance, t-butanol should be mentioned. Alkanes or mixtures of alkanes are furthermore preferred as solvents, whereas cyclohexane is particularly preferred. In particular, the separation of pentenes, and the separation of butenes may be mentioned as particularly preferred examples for the separations of olefins in the liquid phase mentioned above using cyclohexane as solvent. It was surprisingly found that in liquid phase using cyclohexane as solvent, the separation of butenes is favoured compared to the separation of pentenes. The separation of trans-2-butene/1-butene and the separation trans-2-butene/isobutene, as well as the separation of trans-2-pentene from 1-pentene is particularly preferred.

Thus, the present invention relates to the use of a silicate prepared according to the invention, preferably the framework silicate prepared according to the invention having the RUB-41 structure, particularly of a heteroatom-free framework silicate prepared according to the invention having the RUB-41 structure, for the separation of olefins, preferably for the separation of trans-2-olefins and 1-olefins, more preferably for the separation of trans-2-butene and 1-butene or trans-2-pentene and 1-pentene, particularly of trans-2-butene and 1-butene, wherein the separation of the olefins as pure compounds can be carried out in the gas phase or in the liquid phase using at least one solvent, and wherein in case of using at least one solvent alkanes are preferred and cyclohexane is particularly preferred.

Further possible uses of the silicate prepared according to the invention, particularly of the framework silicate prepared according to the invention is their use as additive for catalysts, for example, USY-zeolites which are used in crack-processes, particularly in crack-processes in liquid phase. In this context, the present invention describes not only the use of heteroatom-free framework silicates, but also the use of silicates containing at least one heteroatom as described above. In particular, for example, Al-RUB-41, B-RUB-41, Al/B-RUB-41 may be mentioned. Furthermore, the present invention comprises the partial or complete replacement of the ZSM-5-zeolites and Al- and/or B-ZSM-5-zeolites, respectively, normally used as additives in crack-processes, particularly in crack-processes in liquid phase, by the silicates prepared according to the invention. Inter alia, in the context of the crack-processes, for example, the preparation of lower olefins by catalytic cracking may be mentioned.

As further possible use of the silicate prepared according to the invention, particularly of the framework silicates prepared according to the invention, the use as wash-coat may be mentioned, wherein the wash-coat is applied to monoliths and then, optionally further loaded with at least one noble metal, employed as catalyst. In this context, particularly preferably, for example, automobile catalysts are to be mentioned, which are used to reduce nitrogen oxides $NO_x$, carbon monoxide and/or hydrocarbons. Furthermore three-way catalysts or catalysts which reduce the emissions of diesel engines may be mentioned.

Very generally, the present invention relates to the use of the silicates according to the invention, in particular of the framework silicates, for separating at least one alkane and/or at least one alkene and/or at least one alkyne from a mixture of substances comprising at least two alkanes or at least two alkenes or at least two alkynes or at least one alkane and at least one alkene or at least one alkane and at least one alkyne or at least one alkene and at least one alkyne or at least one alkane and at least one alkene and at least one alkyne, in particular for separating constitutional isomers and/or configurational isomers, the at least one alkane and/or at least one alkene and/or at least one alkyne having up to 10 carbon atoms, such as, for example, 1 carbon atom in the case of methane or 2, 3, 4, 5, 6, 7, 8, 9 or 10 carbon atoms.

The present invention preferably relates to the use of the silicates according to the invention, in particular of the framework silicates, for separating at least one alkane and/or at least one alkene and/or at least one alkyne from a gas mixture comprising at least two alkanes or at least two alkenes or at least two alkynes or at least one alkane and at least one alkene or at least one alkane and at least one alkyne or at least one alkene and at least one alkyne or at least one alkane and at least one alkene and at least one alkyne, in particular for separating constitutional isomers and/or configurational isomers.

In this context, particularly preferred fields of use are the separation of methane and ethane or the separation of ethene, propene and butene, in particular trans-2-butene, or the separation of butane and butene or the separation of n-butane and isobutane or the separation of 1-butene and trans-2-butene.

The silicates according to the invention therefore permit simple separation of mixtures of substances which boil within a narrow range, which separation is not possible by distillative methods without large apparatuses or without the aid of additives. As a result, costs in chemical production processes can be reduced. In such processes, the framework silicate according to the invention is used as such or preferably as molding in at least one suitable apparatus, such as, for example, a tubular reactor, through which the mixture of substances to be separated is passed continuously or batchwise, preferably continuously.

Accordingly, the present invention also relates to an apparatus, in particular a tubular reactor, comprising at least one framework silicate as described above and/or one molding as described above for separating a mixture of substances, in particular for separating at least one alkane and/or at least one alkene and/or at least one alkyne from a gas mixture comprising at least two alkanes or at least two alkenes or at least two alkynes or at least one alkane and at least one alkene or at least one alkane and at least one alkyne or at least one alkene and at least one alkyne or at least one alkane and at least one alkene and at least one alkyne.

According to a particularly preferred embodiment, such a tubular reactor has a length:width ratio greater than or equal to, preferably greater than, 3:1.

The silicate according to the invention or prepared according to the invention, in particular the framework silicate, or a molding which comprises this silicate, can also be used, for example, for the separation of olefin and carbon dioxide, for example for the purification of polyethylene or polypropylene, or as a catalyst for amination, such as, for example, for the preparation of methylamine and/or dimethylamine from methanol and ammonia or from synthesis gas and ammonia, a small proportion of trimethylamine preferably being produced, or for polymerizations, such as, for example, for the preparation of polytetrahydrofuran from tetrahydrofuran, or as a hydroxylation catalyst, such as, for example, for the preparation of phenol from benzene, or generally for reactions with aromatics having a 6-membered ring, or for the conversion of cyclohexanone to cyclohexanone oxime, or for Beckmann rearrangements, such as, for example, for the conversion of cyclohexanone oxime to caprolactam.

Surprisingly, it was found that the novel material, in particular the novel framework silicate of the structure RUB-41, has a very high absorptivity for aromatics or heteroaromatics having a 6-membered ring, in particular for benzene. Accordingly, it is intended to use the novel material also for the separation of benzene from mixtures comprising benzene.

If the framework silicate according to the invention or the molding comprising this framework silicate is used as an adsorbent, for example for separating substances, the desorption of the adsorbed compound or of the adsorbed compounds can be effected either by a suitable reduction of the pressure and/or a suitable temperature change, such as, particularly preferably, by a suitable temperature increase and/or by bringing the framework silicate or the molding comprising this framework silicate into contact with at least one compound which adsorbs more strongly than the compound to be desorbed or compounds to be desorbed.

Depending on the method of use of the framework silicate according to the invention, it may be necessary to regenerate the framework silicate or the molding comprising the framework silicate after a certain time of use.

In a further embodiment of the process according to the invention, the framework silicate and/or the moldings are regenerated after their use in the respective industrial area by a process in which the regeneration is effected by targeted burning-off of the deposits responsible for the declining performance. An inert gas atmosphere which comprises exactly defined amounts of oxygen-donating substances is preferably employed for this purpose. Such a regeneration process is described, inter alia, in WO 98/55228 and DE 197 23 949 A1, in particular in column 2, lines 33 to 54, of DE 197 23 949 A1, the disclosure of which in this context is hereby incorporated by reference into the subject matter of the present application.

The framework silicate and/or the moldings to be regenerated are heated either in the apparatus, for example the tubular reactor, or in an external oven, in an atmosphere which comprises from 0.1 to about 20 parts by volume of oxygen-donating substances, particularly preferably of from 0.1 to 20 parts by volume of oxygen, to a temperature in the range of from 250° C. to 600° C., preferably of from 400° C. to 550° C. and in particular from 450° C. to 500° C. The heating is preferably carried out at a heating rate of from 0.1° C./min to 20° C./min, preferably of from 0.3° C./min to 15° C./min and in particular of from 0.5° C./min to 10° C./min.

During this heating phase heating is effected up to a temperature at which most organic deposits begin to decompose, while at the same time the temperature is regulated by means of the oxygen content and hence does not increase to such an extent that the framework silicate structure and/or molding structure is damaged. The slow increase of the temperature and the residence at low temperature as a result of establishing the appropriate oxygen content and the appropriate heating power is, in the case of high organic loads, a substantial step for preventing local overheating of the framework silicate and/or of the moldings.

If the temperature of the waste gas stream at the reactor exit decreases in spite of increasing amounts of oxygen-donating substances in the gas stream the organic deposits have been completely burned off. The duration of the treatment is in general in each case from 1 to 30, preferably from about 2 to about 20 and in particular from about 3 to about 10 hours.

The subsequent cooling of the framework silicate thus regenerated and/or of the moldings is preferably carried out in such a way that the cooling does not take place too rapidly, since otherwise the mechanical strength, for example of the moldings, may be adversely affected.

It may be necessary to follow the regeneration carried out by calcination, as described above, a washing with water and/or dilute acids, such as, for example, hydrochloric acid, in order to remove any inorganic load remaining as a result of contamination of the starting materials (traces of alkali, etc.). Further drying and/or further calcination can then be carried out.

According to a further embodiment of the process according to the invention the framework silicate, which is at least partly deactivated for the respective industrial field of use, and/or the moldings can, before the heating according to the regeneration procedure, be washed with a solvent in the reactor in which the reaction was carried out or in an external reactor in order to remove desired product which is still adhering. The washing is carried out in such a way that, although the respective adhering desired products can be removed, temperature and pressure are not chosen to be so high that the generally organic deposits are also removed. Preferably, only washing with a suitable solvent is carried out. Thus, all solvents in which the respective desired product is readily soluble are suitable for this washing process. The amount of solvent used and the duration of the washing process are not critical. The washing process can be repeated several times and can be carried out at elevated temperature. With the use of $CO_2$ as solvent, supercritical pressure is preferred; otherwise, the washing process can be carried out under atmospheric pressure or elevated or supercritical pressure. After the end of the washing process, in general drying is effected. Although the drying process is generally not critical, the drying temperature should not too greatly exceed the boiling point of the solvent used for washing, in order to avoid abrupt vaporization of the solvent in the pores, in particular in the micropores, since this too can lead to damage to the lattice structure.

For process optimization, it is possible to use at least two apparatuses in which in each case the framework silicate according to the invention and/or the moldings is or are present, at least one apparatus being taken out of operation and at least one apparatus remaining in operation in the case of the regeneration, so that the process need not be interrupted at any time.

The present invention is explained in more detail with reference to the examples, figures and tables described below.

EXAMPLES

Example 1

Preparation of a Sheet Silicate of Structure Type RUB-39

Aerosil 200 (pyrogenic silica, 1.22 mol, 97.7 g) was stirred with dimethyldipropylammonium hydroxide (716.9 g, 0.81 mol, 16.7% by weight aqueous solution, from Sachem) in a beaker. Then, seed crystals of a silicate (zeolite having the structure RUB-39; 2.0 g) were added. The sol formed was stirred for 1 h and then concentrated to 510 g in a rotary evaporator under reduced pressure at 70° C. The sol was then divided between 3 autoclave beakers (LAB 1 (166 g), LAB 2 (154 g) and LAB 3 (154 g)).

The crystallization was carried out in each case at 150° C., wherein the crystallization time was a period of 84 h in LAB 1, of 180 h in LAB 2 and of 252 h in LAB 3.

After removal, a white suspension was obtained in each case from LAB 1 to LAB 3. The respective white precipitate was separated from the suspensions by centrifuging and was washed with water. Drying was then effected in each case for 24 h at 120° C. A white powder was obtained in each case.

The amount weighed out from LAB 1 was 19.9 g, corresponding to a yield of 48% based on the $SiO_2$ used.

The amount weighed out from LAB 2 was 26.4 g, corresponding to a yield of 69% based on the $SiO_2$ used.

The amount weighed out from LAB 3 was 30.2 g, corresponding to a yield of 79% based on the $SiO_2$ used.

Figure 1:
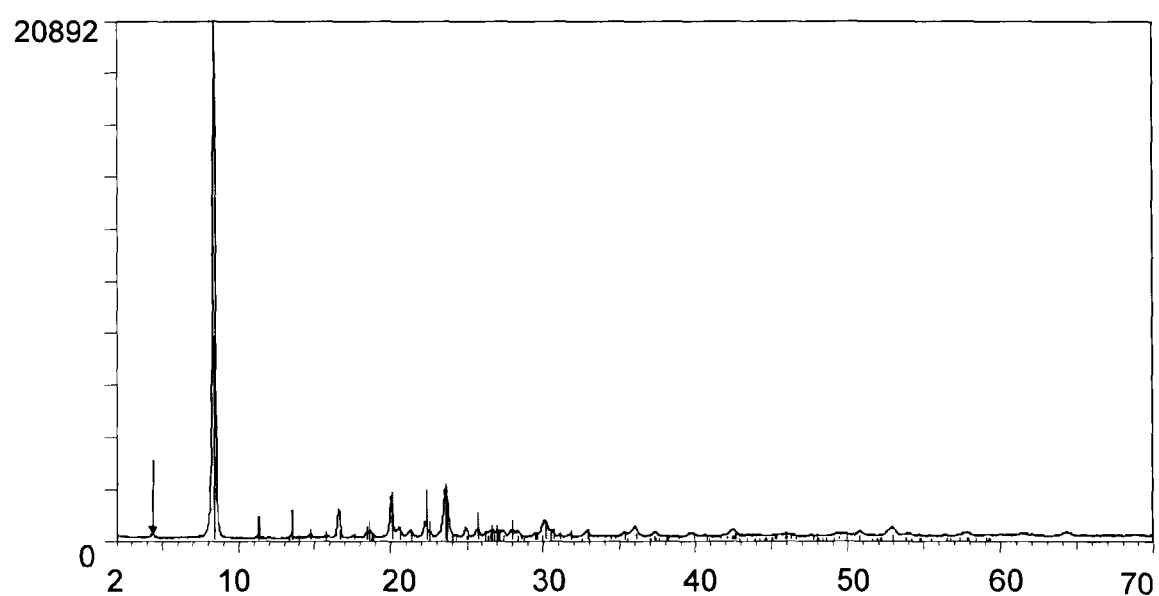
FIG. 1 shows the X-ray diffractogram of the dried sheet silicate of the structure RUB-39 obtained according to example 1. The powder X-ray diffractogram was recorded on a Siemens D-5000 using monochromatic Cu K alpha 1 radiation, a capillary sample holder being used to avoid a preferential orientation. The diffraction data were collected using a position-sensitive detector from Braun in the range of from 8 to 96° (2 theta) and a step interval of 0.0678°. Indexing of the powder diagram was effected using the program Treor90, implemented in powder-X (Treor90 is a public domain program which is freely available via the URL http://www.ch.i-ucr.org/sincris-top/logiciel/). In the figure, the angle 2 theta in ° is stated along the abscissa and the intensities are plotted along the ordinate.

FIG. 1 shows the X-ray diffractogram of the sheet silicate obtained. It is clear from it that the silicate is a pure RUB-39 silicate.

Example 2

Preparation of a Sheet Silicate of Structure Type RUB-39

Aerosil 200 (pyrogenic silica, 0.34 mol, 20.4 g) was stirred with dimethyldipropylammonium hydroxide (149.6 g, 0.17 mol, 16.7% strength by weight aqueous solution, from Sachem) in a beaker. Then, seed crystals of a silicate (zeolite having the structure RUB-39; 0.4 g) were added. The sol formed was stirred for 2 h and then introduced into an autoclave beaker (LAB 1) without concentration.

The crystallization was carried out at 150° C., wherein the crystallization time was 120 h.

After removal, a white suspension was obtained from LAB 1. The white precipitate was separated from the suspension by centrifuging and was washed with water. Drying was then effected for 24 h at 120° C. A white powder was obtained.

The resulting weight of LAB 1 was 14.6 g, corresponding to a yield of 53%, based on the $SiO_2$ used.

Figure 2:
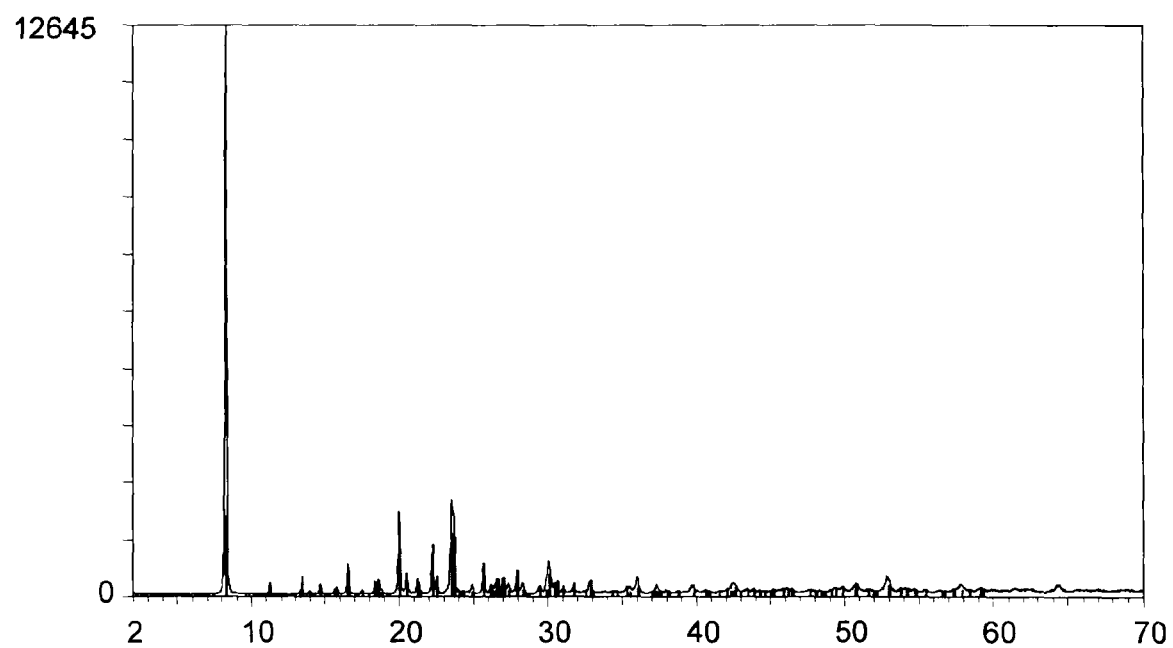
FIG. 2 shows the X-ray diffractogram of the dried sheet silicate of the structure RUB-39 obtained according to example 2. For the method of measurement, reference is made to the statements relating to FIG. 1.

FIG. 2 shows the X-ray diffractogram of the sheet silicate obtained. It is clear from it that the silicate is a pure RUB-39 silicate.

Example 3

Preparation of a Sheet Silicate of Structure Type RUB-39

Aerosil 200 (pyrogenic silica, 3.4 mol, 204 g) was stirred with dimethyldipropylammonium hydroxide (1496.0 g, 1.7 mol, 16.7% strength by weight aqueous solution, from Sachem) in a beaker. Then, seed crystals of a silicate (zeolite having the structure RUB-39; 4.0 g) were added. The sol formed was stirred for 2 h and then introduced into an autoclave beaker (LAB 1) without concentration.

The crystallization was carried out at 150° C., wherein the crystallization time was 192 h.

After removal, a white suspension was obtained from LAB 1. The white precipitate was separated from the suspension by centrifuging and was washed with water. Drying was then effected for 24 h at 120° C. A white powder was obtained.

The resulting weight of LAB 1 was 147.8 g, corresponding to a yield of 54%, based on the SiO$_2$ used.

Figure 3:
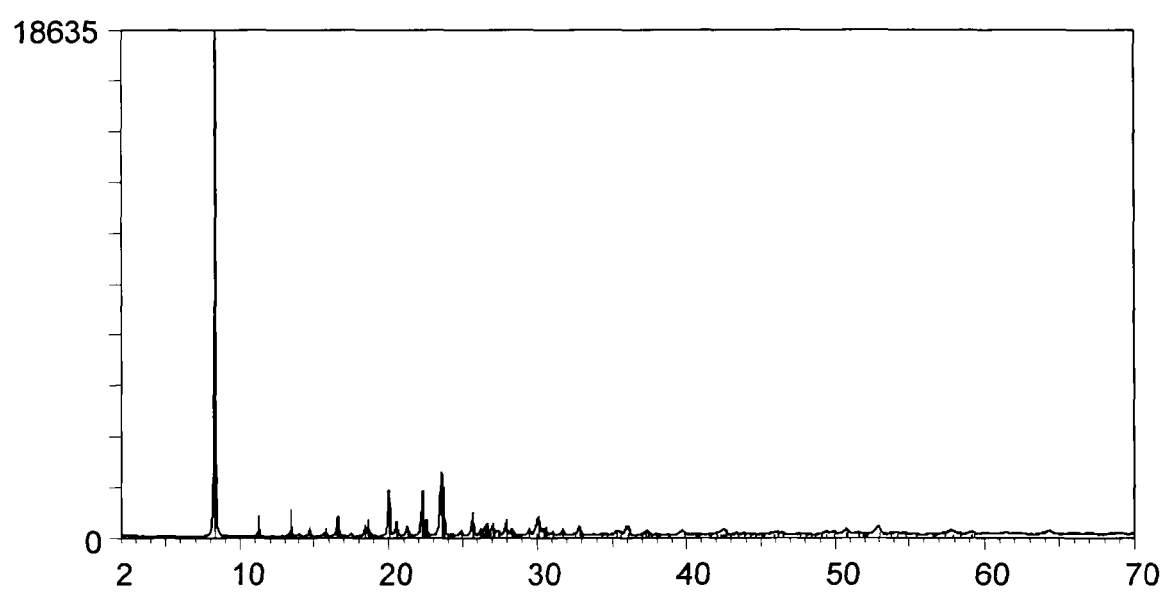
FIG. 3 shows the X-ray diffractogram of the dried sheet silicate of the structure RUB-39 obtained according to example 3. For the method of measurement, reference is made to the statements relating to FIG. 1.

FIG. 3 shows the X-ray diffractogram of the sheet silicate obtained. It is clear from it that the silicate is a pure RUB-39 silicate.

Example 4

Preparation of a Sheet Silicate of Structure Type RUB-39 without Addition of Crystallization Assistant Comparative Example Cab-o-Sil M7D (pyrogenic silica, 1.08 mol, 65.1 g) was stirred with dimethyldipropylammonium hydroxide (477.9 g, 0.54 mol, 16.7% by weight aqueous solution, from Sachem) in a beaker. No seed crystals of a silicate were added. The sol formed was concentrated to 340 g in a rotary evaporator under reduced pressure at 70° C. and then divided approximately equally between two autoclave beakers (LAB 1 and LAB 2).

The crystallization was carried out at 175° C., wherein the crystallization time was 720 h.

After removal, a white suspension was obtained in each case from LAB 1 and LAB 2. The white precipitate was separated from the respective suspension by centrifuging and was washed with water. Drying was then effected in each case for 24 h at 120° C. A white powder was obtained in each case.

The resulting weight of LAB 1 was 24.8 g, corresponding to a yield of 28%, based on the SiO$_2$ used.

The resulting weight of LAB 2 was 28.3 g, corresponding to a yield of 33%, based on the SiO$_2$ used.

The silicate is in each case a pure RUB-39 silicate.

This example shows that, in comparison with examples 1 to 3 according to the invention, the yield obtained is substantially lower in spite of the higher crystallization temperature and a considerably longer crystallization time (30 d). This makes the process according to the invention advantageous particularly for processes carried out on an industrial or large industrial scale.

Example 5

Preparation of a Framework Silicate Of Structure Type RUB-41 from a Sheet Silicate of Structure Type RUB-39

Figure 4:
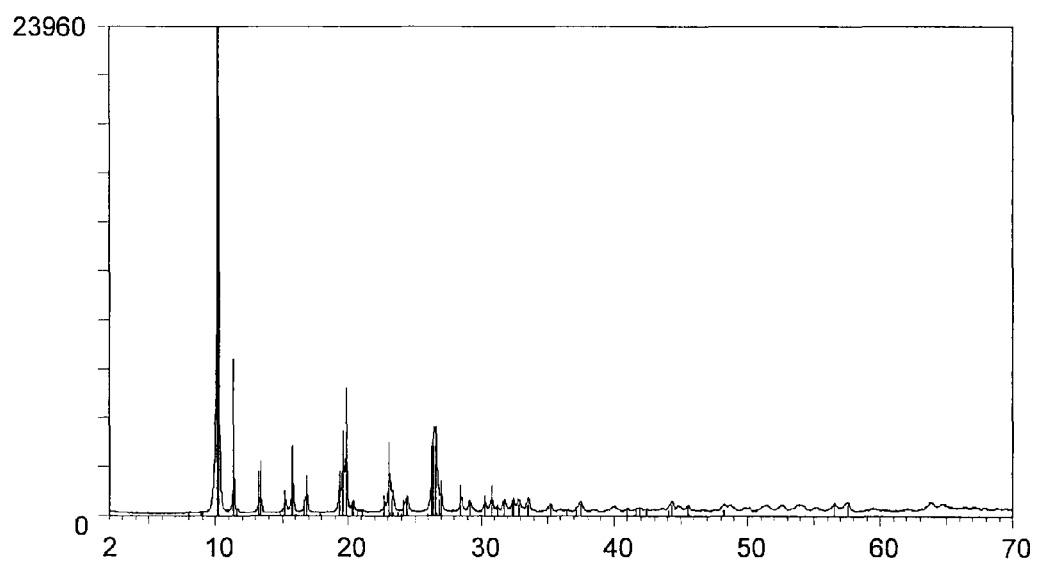
FIG. 4 shows the X-ray diffractogram of the framework silicate of the structure RUB-41 obtained according to example 5. For the measurement procedure, reference is made to example 5 and additionally to the statements relating to FIG. 1.

A sample (16.5 g) of the dried silicate powder of structure RUB-39, obtained according to example 3, was brought stepwise to a temperature of 500° C. at a rate of 1° C./min in an "in situ" XRD camera under air. Depending on the temperature, the diffractogram shown in FIG. 4, which shows the conversion of RUB-39 into RUB-41 from a temperature of about 225° C., was obtained.

Example 6

Preparation of a Sheet Silicate of the Structure Type Al-RUB-39 and the Corresponding Framework Silicate of the Structure Type Al-RUB-41

0.066 g NaAlO$_2$ were mixed with 10.6 g DMDPAH. 0.05 g NaOH and 0.5 g seed crystals of a silicate of the structure type RUB-39 were added to this mixture. After stirring, a homogeneous gel was obtained, which was mixed with 1.44 g aerosil 200 (pyrogenic silica). The mixture was subsequently concentrated at 70° C. yielding in a mixture having molar ratios of about:

SiO$_2$: 0.5 DMDPAH: 1/30 NaAlO$_2$: 0.05 NaOH: 8H$_2$O

Figure 5:
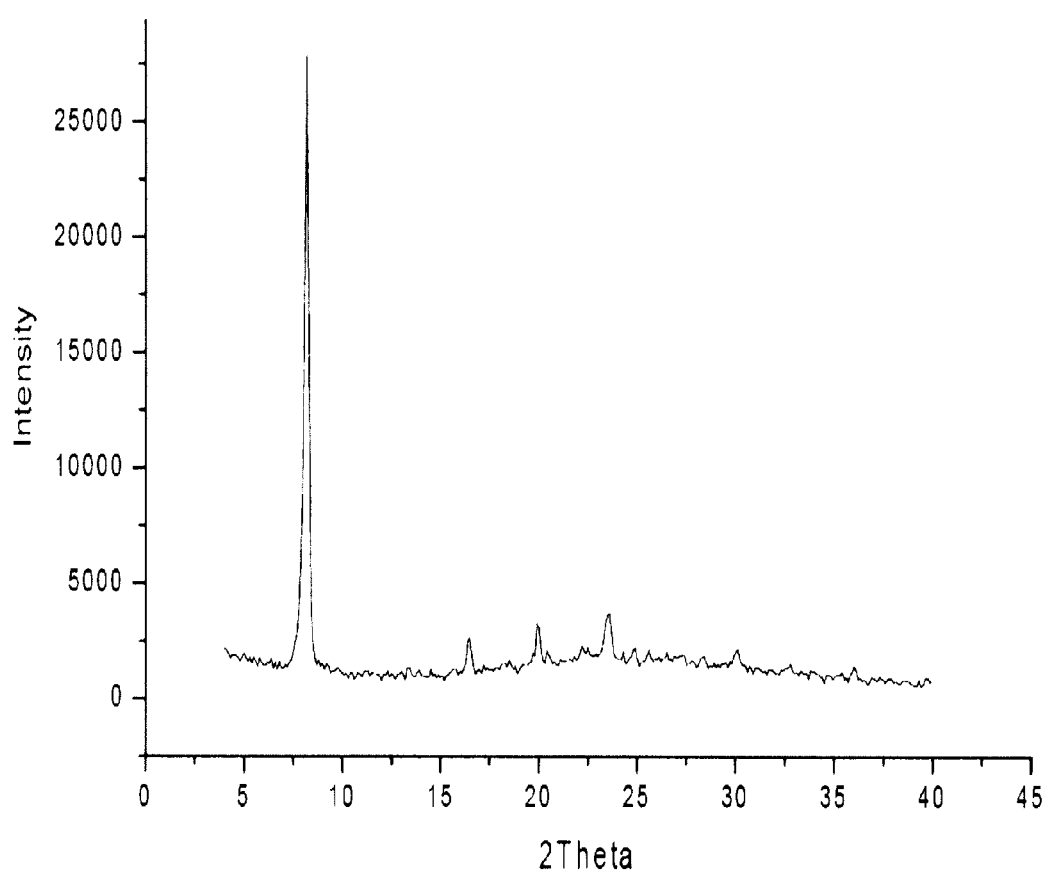
FIG. 5 shows the X-ray diffractogram of the dried sheet silicate of the structure Al-RUB-39 obtained according to example 6, prepared by adding NaOH. For the method of measurement, reference is made to the statements relating to FIG. 1.
Figure 6:
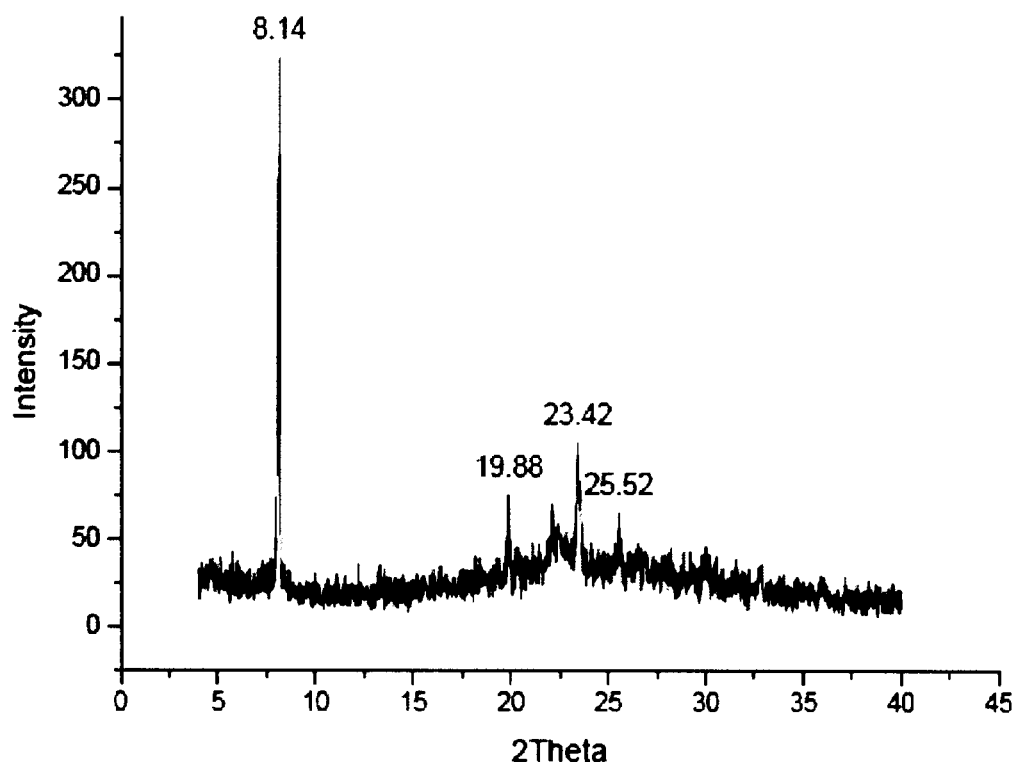
FIG. 6 shows the X-ray diffractogram of the dried sheet silicate of the structure Al-RUB-39 obtained according to Example 6, prepared with addition of NaCl. For the method of measurement, reference is made to the statements relating to FIG. 1.
Figure 7:
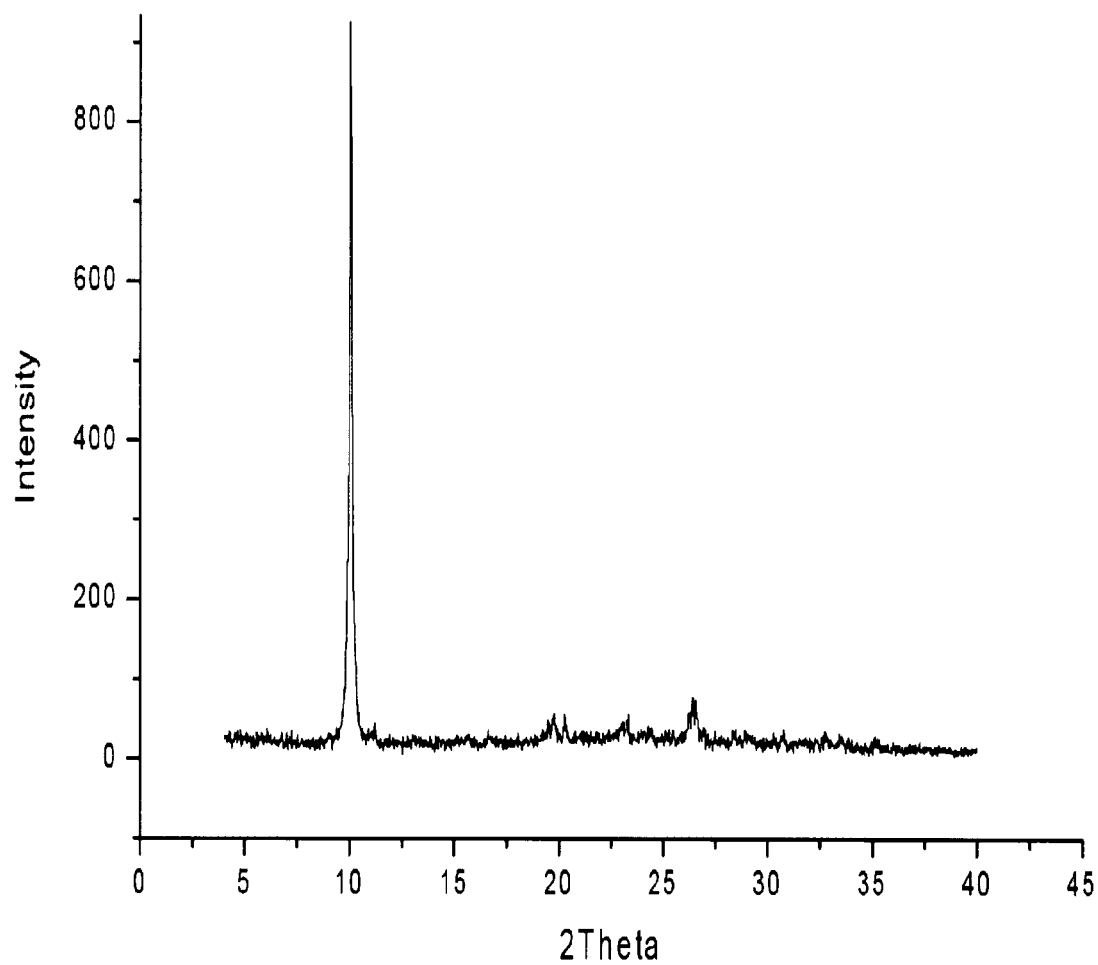
FIG. 7 shows the X-ray diffractogram of the calcined framework silicate of the structure Al-RUB-41 obtained according to Example 6. For the method of measurement, reference is made to the statements relating to FIG. 1.

The mixture was transferred into an autoclave and crystallized for a period of 8 days at 140° C., separated by filtration and dried at 110° C. A sheet silicate of the structure type Al-RUB-39 was obtained, whose X-ray diffractogram is shown in FIG. 5. The experiment was repeated in an identical manner, where NaCl was used as sodium source instead of NaOH in an amount affecting the molar composition of the mixture to be hydrothermally crystallized of:

SiO$_2$: 0.5 DMDPAH: 1/30 NaAlO$_2$: 0.05 NaCl: 8H$_2$O,

Subsequently, the mixture was transferred into an autoclave and crystallized for a period of 8 days at 140° C., separated by filtration and dried at 110° C. A sheet silicate of the structure type Al-RUB-39 was obtained, whose X-ray diffractogram is shown in FIG. 6. The sheet silicate of the type Al-RUB-39 obtained using NaOH was calcined for 3 hours at 600° C., yielding in a framework silicate of the structure type Al-RUB-41. The X-ray diffractogram of the framework silicate thus obtained is shown in FIG. 7.

Figure 8:
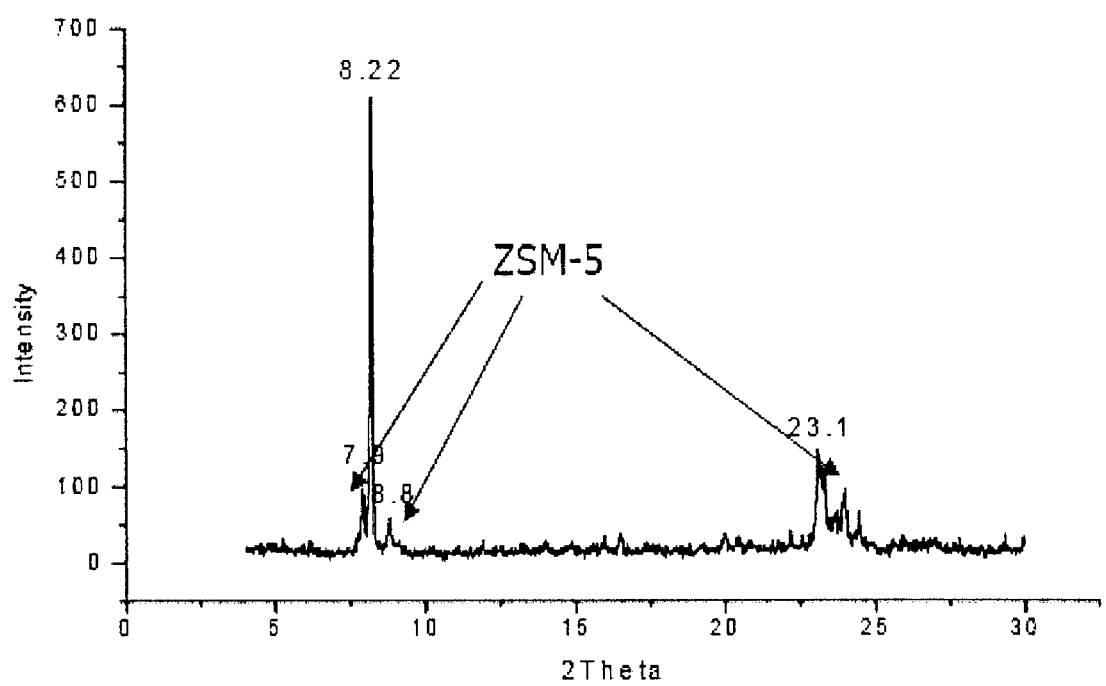
FIG. 8 shows the X-ray diffractogram of the sheet silicate of the structure Al-RUB-39 having impurities with ZSM-5 phase. For the method of measurement, reference is made to the statements relating to FIG. 1.

It was found that an Al-RUB-39, which was almost ZSM-5-free, could be obtained by this process. In this context, reference may be made to the Al-RUB-39 containing ZSM-5-impurities according to FIG. 8.

Each experiment was repeated five times, wherein the results were reproducible, respectively.

Example 7

Preparation of a Sheet Silicate of the Structure Type B-RUB-39

According to the following table, experiments for the preparation of B-RUB-39 using RUB-39 crystals as crystallization auxiliaries, were carried out. In all cases, B-RUB-39 was obtained being essentially free of ZSM-5-phase:

| Si-gel/ mol SiO$_2$ | DMDPAH/ mol | water/ mol | H$_3$BO$_3$/ mol | crystallization- temp./° C. | crystallization peroid/d |
|---|---|---|---|---|---|
| 0.0194 | 0.01 | 0.20 | 0.0006 | 150 | 14 |
| 0.0192 | 0.01 | 0.20 | 0.0008 | 150 | 13 |
| 0.019 | 0.01 | 0.20 | 0.001 | 150 | 13 |
| 0.0192 | 0.01 | 0.02 | 0.0008 | 150 | 13 |
| 0.0192 | 0.01 | 0.02 | 0.0008 | 150 | 7 |

Example 8

Separation Of Olefins in Liquid Phase Using a Heteroatom-Free Framework Silicate of the Structure RUB-41

All Silica RUB-41

40 mg RUB-41 according to Example 5 as well as silicalite and ferrierite were added to 1.1 ml cyclohexane solution containing trans-2-butene and 1-butene in a chromatographic vial. The solution contained about 0.5 percent by weight of each butene. To avoid leak-out of the butenes, the vial was filled completely. The supernatant was injected into the GC after equilibration over night. The analysis was compared with the analysis of an identical solution in an identical vial containing no RUB-41 and no silicalite and no ferrierite, respectively. The separation factor alpha was determined according to the following formula:

$$\text{alpha} = [(m_{t\text{-}2\text{-butene,zeolite}})/(m_{1\text{-butene,zeolite}})] / [(m_{t\text{-}2\text{-butene,liquid phase}})/(m_{1\text{-butene,liquid phase}})]$$

The following results were obtained:

| Zeolite | $m_{olefin}$ offered/ g/g zeolite | | uptake$_{olefin}$/ g/g zeolite | | uptake (%) (t-2-butene) | uptake (%) (1-butene) | alpha |
|---|---|---|---|---|---|---|---|
| | t-2-butene | 1-butene | t-2-butene | 1-butene | | | |
| RUB-41 | 0.149 | 0.086 | 0.031 | 0.001 | 21 | 1 | 18 |
| | 0.083 | 0.047 | 0.019 | 0.002 | 23 | 5 | 5 |
| Ferrierite | 0.155 | 0.089 | 0.024 | 0.001 | 15 | 2 | 14 |
| | 0.082 | 0.044 | 0.031 | 0.005 | 38 | 11 | 4.9 |
| Silicalite | 0.134 | 0.074 | 0.041 | 0.020 | 30 | 26 | 1.2 |

The results clearly show that the heteroatom-free RUB-41 had the best separation efficiency in the separation of trans-2-butene and 1-butene among the three tested zeolites using comparable amounts of offered olefin.

We claim:

1. A process for the preparation of a framework silicate comprising at least silicon and oxygen, comprising:
   (1) mixing silicon dioxide and/or silicon dioxide precursor with an aqueous solution comprising at least one tetraalkylammonium compound comprising $R_1R_2R_3R_4N^+$ and at least one base, wherein $R_1$ and $R_2$ are methyl and both $R_3$ and $R_4$ are n-propyl to provide a colloidal solution;
   (2) heating, for a time ranging from 12 h to 260 h said colloidal solution to a temperature and pressure in a range of from a temperature which is greater than the boiling point of the colloidal solution under a chosen pressure to 180° C. at atmospheric pressure to give a suspension comprising at least one sheet silicate, and
   (3) calcining a first part of the sheet silicate obtained according to (2) to give the framework silicate,
   wherein a second part of the sheet silicate obtained according to (2), which is not calcined and comprises at least silicon and oxygen, is added as a crystallization auxiliary in (1).

2. The process according to claim 1, wherein, in (1), the sheet silicate is added in an amount of from 0.1 to 5% by weight, based on silicon dioxide and/or on silicon dioxide present in the silicon dioxide precursor.

3. The process according to claim 1, wherein the mixture formed according to (1) is concentrated before the heating according to (2).

4. The process according to claim 3, wherein the colloidal solution obtained according to (1), optionally after concentration, is heated to a temperature of from 100 to 180° C. according to (2) in an autoclave.

5. The process according to claim 1, wherein the at least one tetraalkylammonium compound comprising $R_1R_2R_3R_4N^+$ comprises a basic anion.

6. The process according to claim 1, wherein the aqueous solution used according to (1) comprises dimethyldipropylammonium hydroxide (DMDPAH).

7. The process according to claim 1, wherein the colloidal solution obtained according to (1) comprises $SiO_2$, DMDPAH and water in the weight ratios $SiO_2$:DMDPAH:water in the range of 1:(0.4-10):(4-12).

8. The process according to claim 1, wherein the colloidal solution obtained according to (1) comprises $SiO_2$, DMDPAH and water in the weight ratios $SiO_2$:DMDPAH:water of 1:(0.4-2):(4-8).

9. The process according to claim 1, wherein the colloidal solution obtained according to (1) comprises $SiO_2$, DMDPAH and water in the weight ratios $SiO_2$:DMDPAH:water of 1:(0.45-0.55):(8-12).

10. The process according to claim 1, wherein amorphous silicon dioxide is used according to (1).

11. The process according to claim 1, wherein a source of an aluminum, boron, iron, titanium, tin, germanium, zirconium, vanadium, and/or niobium is additionally used according to (1).

12. The process according to claim 1, further comprising before (3):
    separation of the at least one sheet silicate from the suspension obtained according to (2) into said first part and said second part.

13. The process according to claim 12, further comprising before (3):
    washing
    and/or
    drying
    the sheet silicate obtained according to said separation of claim 12.

14. The process according to claim 13, wherein the sheet silicate is washed with water and/or dried at a temperature in the range of from room temperature to 150° C.

15. The process according to claim 14, wherein the calcination is effected at a temperature in the range of from 300 to 600° C.

16. The process according to claim 1, further comprising:
    separation of the at least one sheet silicate from the suspension obtained according to (2) into said first part and said second part, and
    washing
    and/or
    drying
    the sheet silicate obtained according to said separation.

17. The process according to claim 16, wherein the sheet silicate is washed with water and/or dried at a temperature in the range of from room temperature to 150° C.

18. The process according to claim 1, further comprising separation of the at least one sheet silicate from the suspension obtained according to (2) into said first part and said second part, washing
and/or
drying of the sheet silicate obtained according to said separation, and
calcining the first part of the sheet silicate obtained according to (2), wherein the product of calcination is
separated off and
washed and/or dried
to give the framework silicate.

* * * * *